United States Patent [19]

Matsumoto et al.

[11] Patent Number: 5,016,117
[45] Date of Patent: May 14, 1991

[54] OPTICAL READER HAVING APPARATUS FOR DISCRIMINATION BETWEEN DITHER-MATRIX AND NON-DITHER-MATRIX READING AREAS, AND/OR MEANS FOR DETERMINING LIGHT EMITTER DRIVE POWER VALUES BY USING REFERENCE REFLECTOR SURFACE

[75] Inventors: Takayuki Matsumoto; Shuji Otsuka, both of Nagoya; Tetsuo Harano, Inazawa; Kouzi Takeyama; Suzuyo Murai, both of Nagoya; Kouichi Mino; Koji Matsumura, both of Kashiwa; Chikamasa Hattori, Ichinomiya; Kazuhiro Kuwabara, Tokoname, all of Japan

[73] Assignee: Brother Kogyo Kabushiki Kaisha, Aichi, Japan

[21] Appl. No.: 285,854

[22] Filed: Dec. 16, 1988

[30] Foreign Application Priority Data

Dec. 29, 1987 [JP] Japan ................................ 62-332489
Apr. 1, 1988 [JP] Japan ................................ 63-81688
Apr. 1, 1988 [JP] Japan ................................ 63-81689

[51] Int. Cl.$^5$ .............................................. H04N 1/40
[52] U.S. Cl. .................................... 358/456; 358/457; 358/443
[58] Field of Search .............. 358/455, 456, 457, 443, 358/445, 446, 447, 461, 464

[56] References Cited

U.S. PATENT DOCUMENTS

| 4,495,522 | 1/1985 | Matsunawa et al. | 358/457 |
| 4,517,606 | 5/1985 | Yokomizo et al. | 358/457 |
| 4,660,082 | 4/1987 | Tomohisa et al. | 358/446 |
| 4,663,662 | 5/1987 | Sekizawa et al. | 358/457 |
| 4,686,579 | 8/1987 | Sakamoto | 358/457 |
| 4,689,692 | 8/1987 | Harano et al. | 358/457 |
| 4,709,274 | 11/1987 | Tanioka | 358/457 |
| 4,740,843 | 4/1988 | De Vogel et al. | 358/456 |

FOREIGN PATENT DOCUMENTS 61-123357 6/1986 Japan .

Primary Examiner—Alvin E. Oberley
Assistant Examiner—Thomas D. Lee
Attorney, Agent, or Firm—Oliff & Berridge

[57] ABSTRACT

An optical reading including a device for effecting discrimination between a dither-matrix reading area and a non-dither-matrix reading area on a subject copy, an irradiating device for irradiating local segments of the subject copy with light beams having different intensities, a reading device for obtaining image data representative of the presence or absence of an achromatic tone in each local segment based on an amount of the light beam reflected by each local segment, a control device for operating the irradiating and reading devices to irradiate the local segments in a predetermined discriminating zone of the subject copy with the light beams having different intensities at different times, to obtain first and second image data, a device for comparing the first and second image data of each local segment in the discrimination zone, to determine whether the first and second image data agree with each other or not for each local segment, and a device for determining that the discrimination zone is the dither-matrix reading area, if a degree of disagreement of the first and second image data exceeds a predetermined reference value, and determining that the discrimination zone is the non-dither-matrix reading area, if the degree of disagreement does not exceed the reference value.

16 Claims, 28 Drawing Sheets

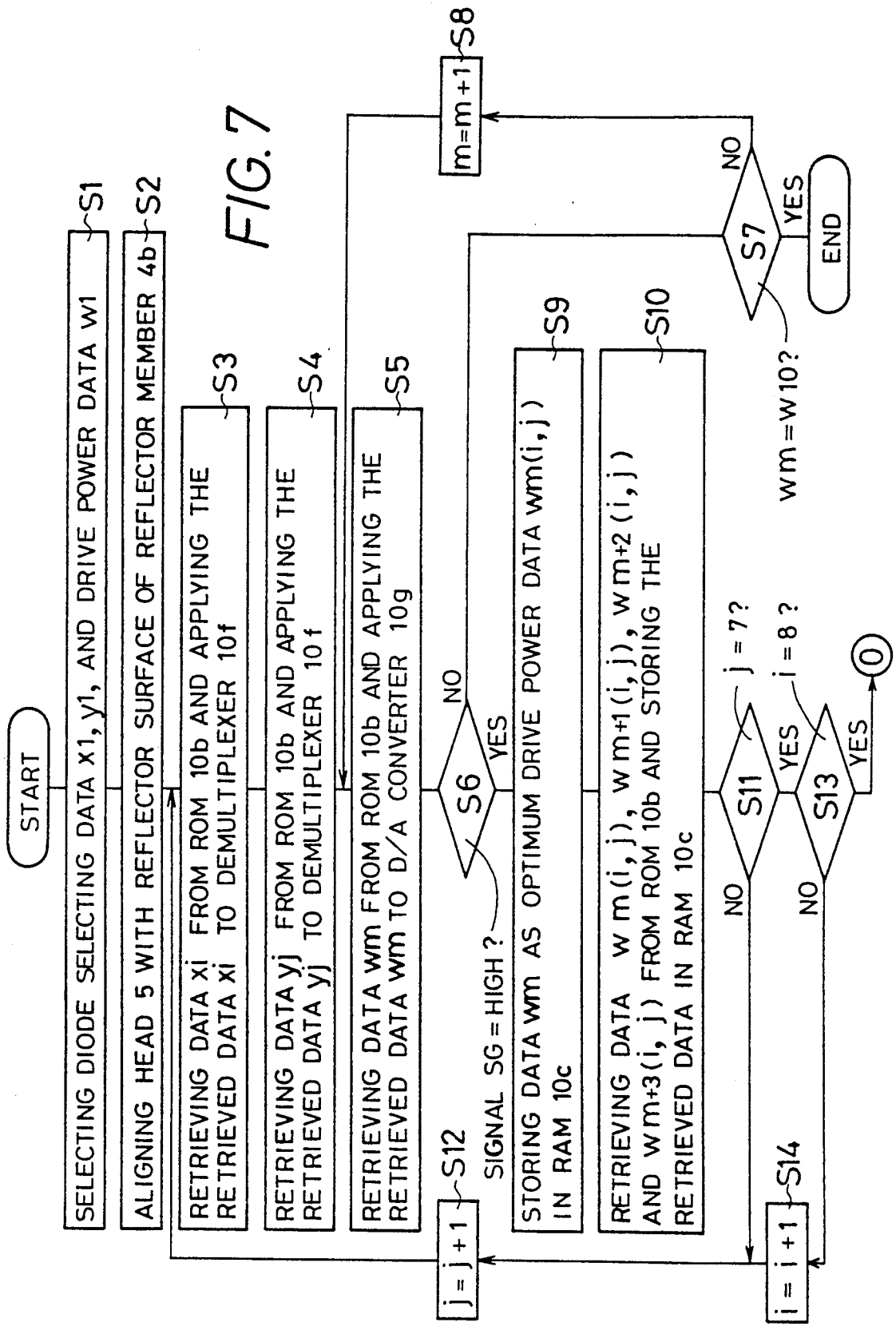

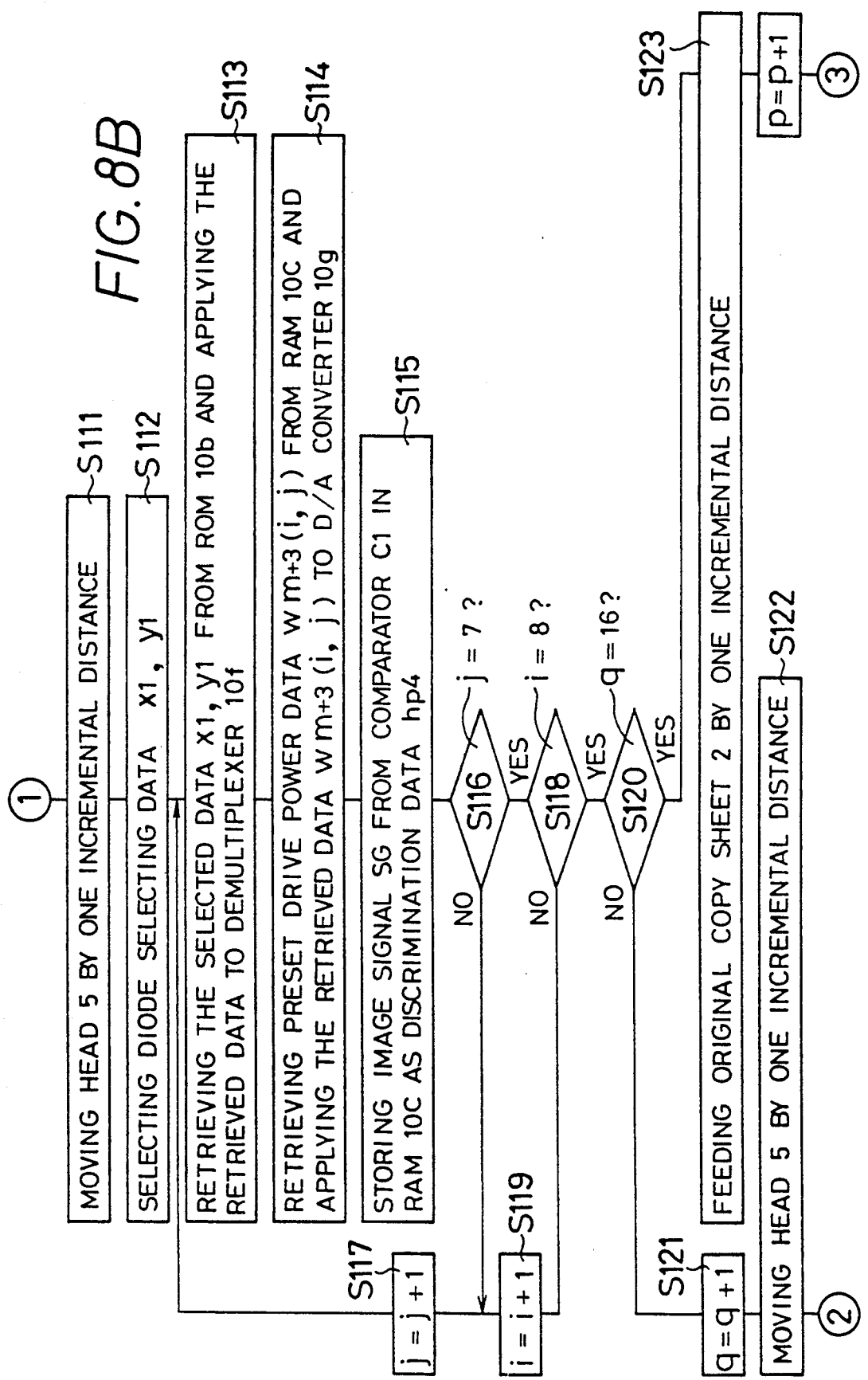

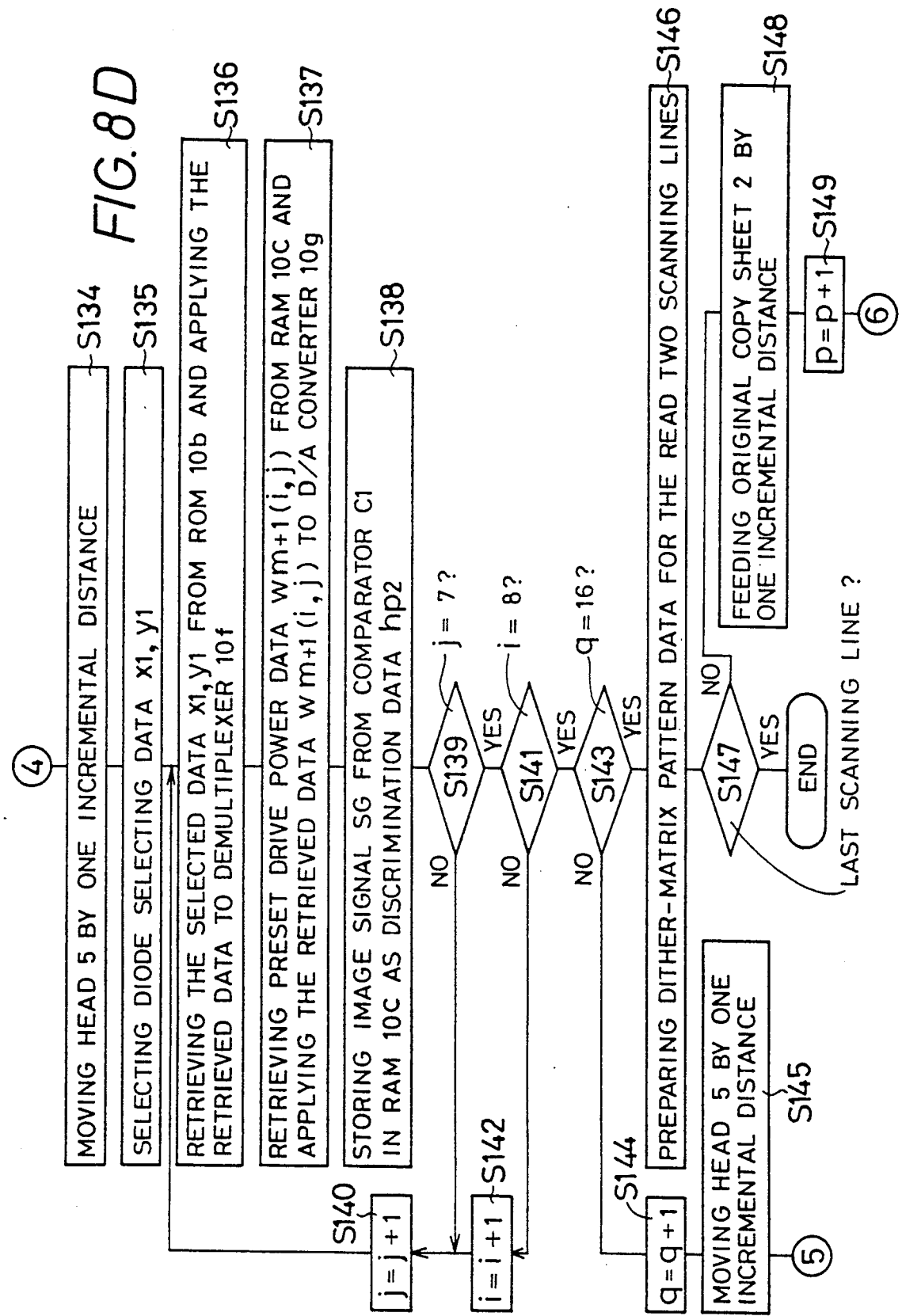

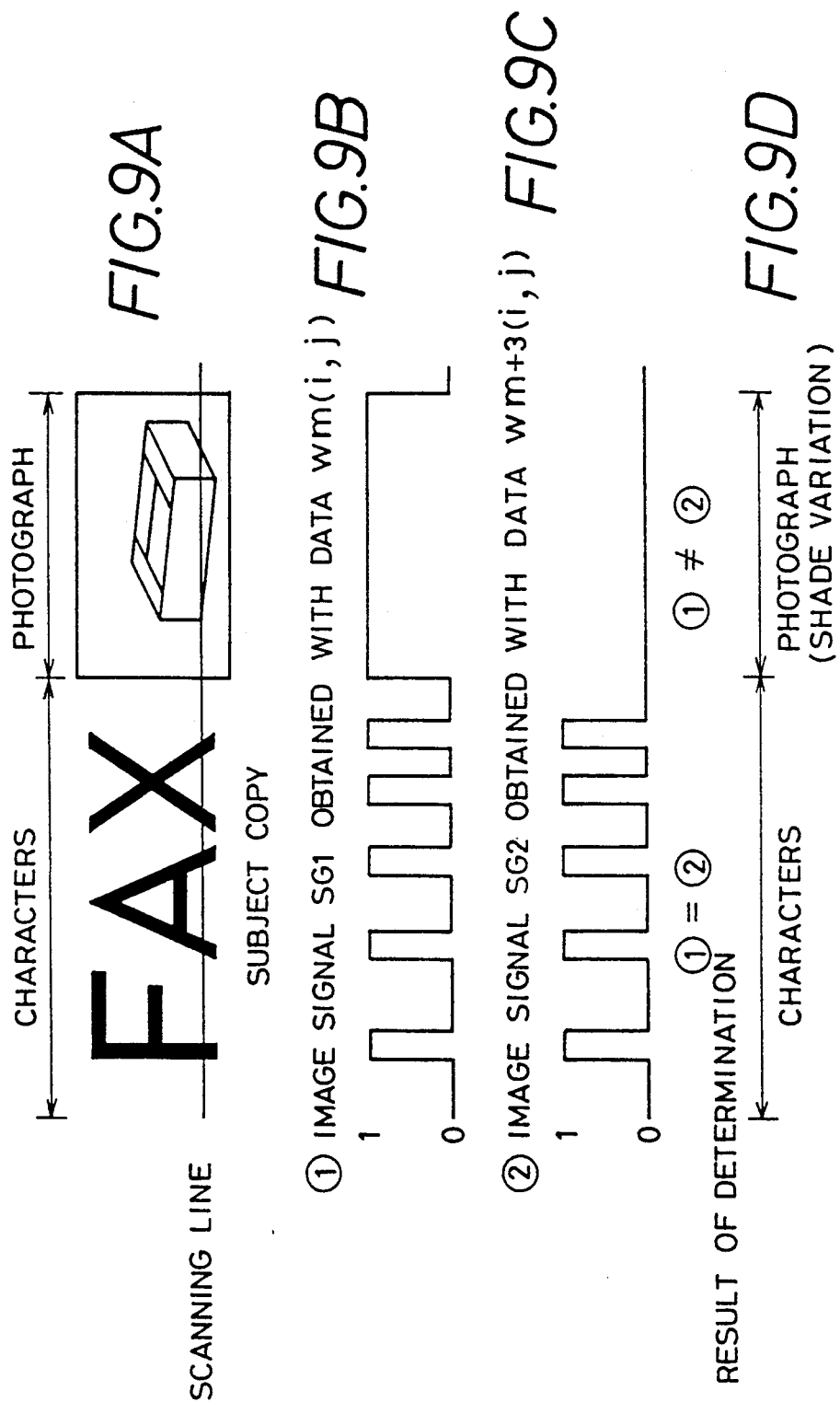

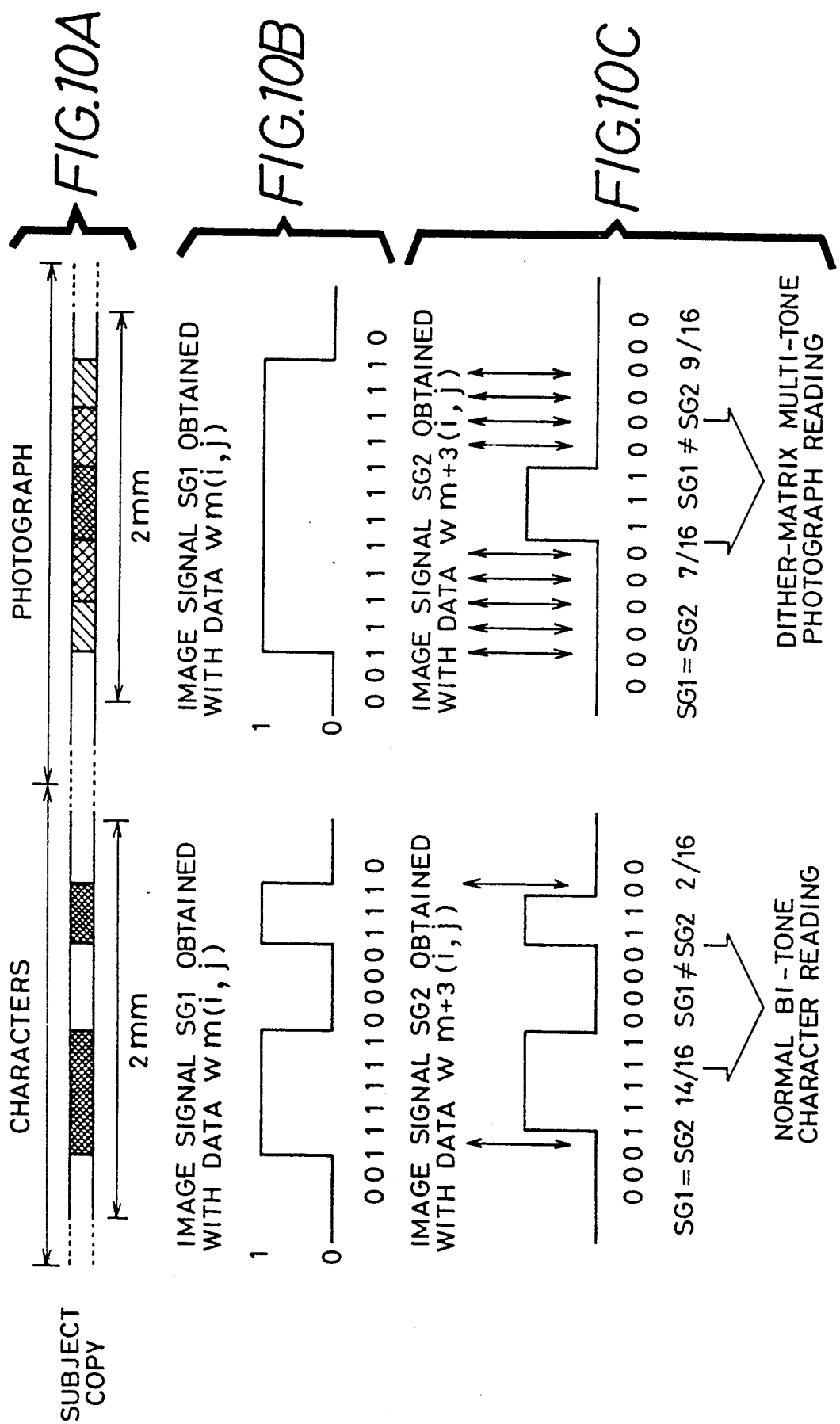

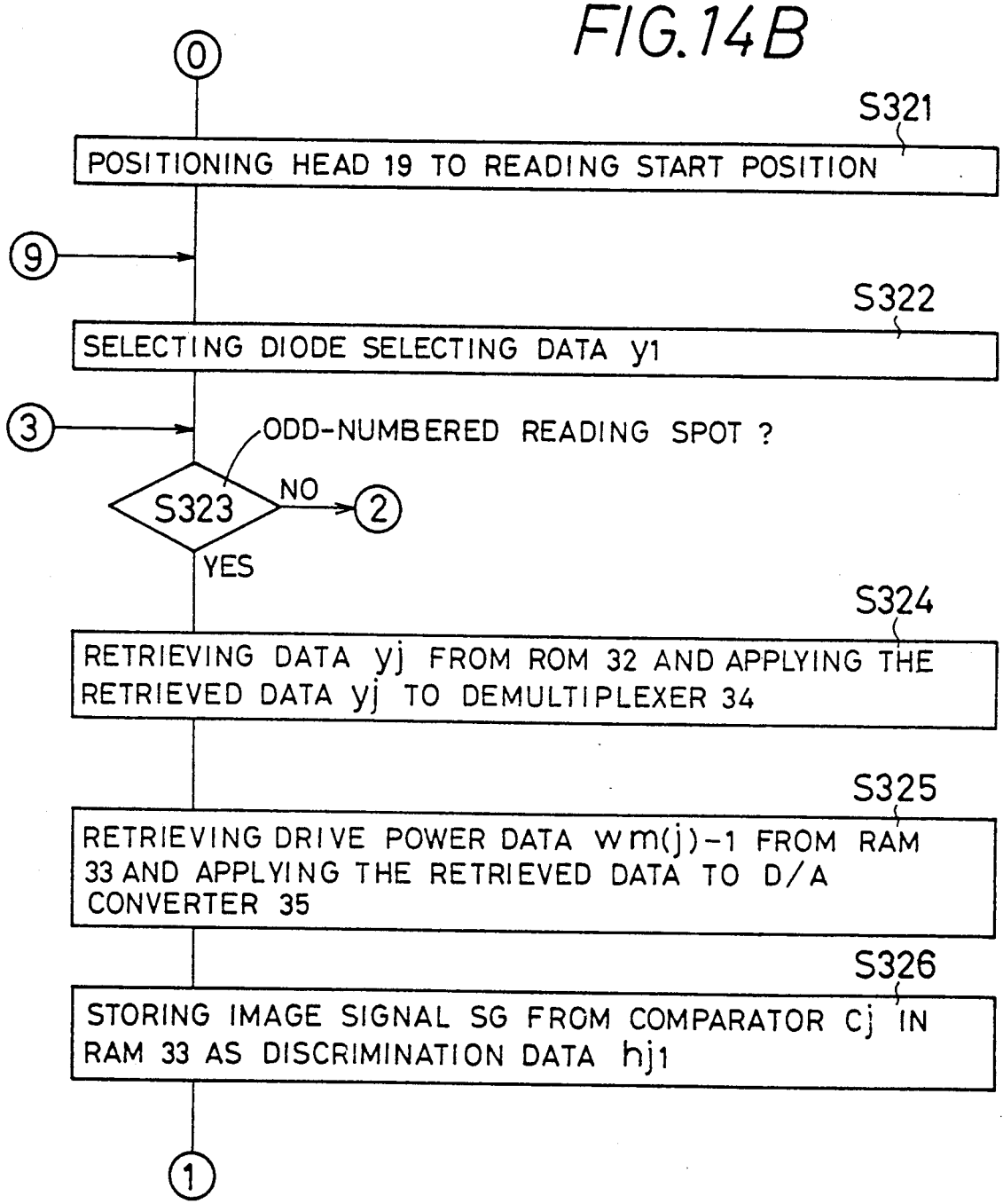

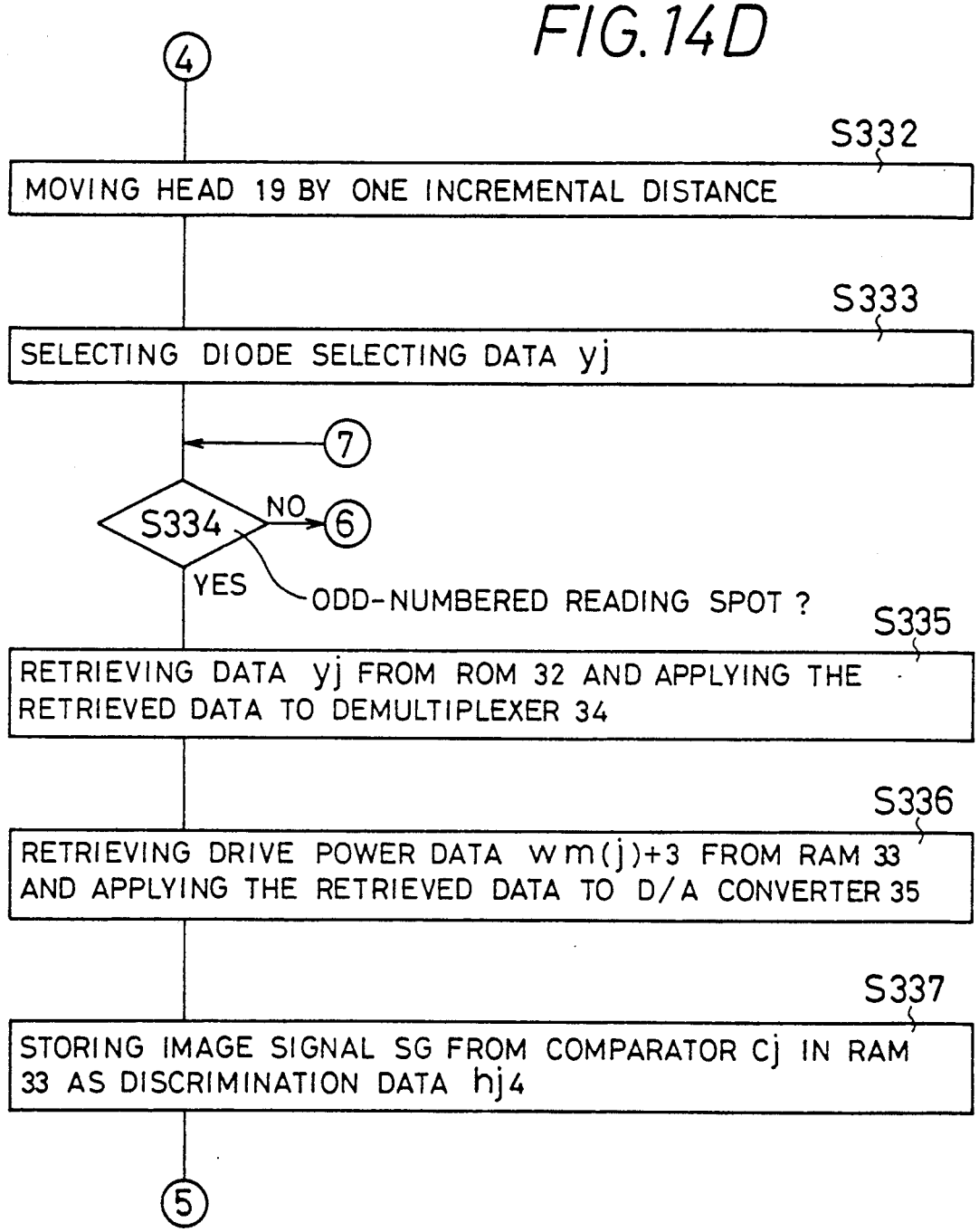

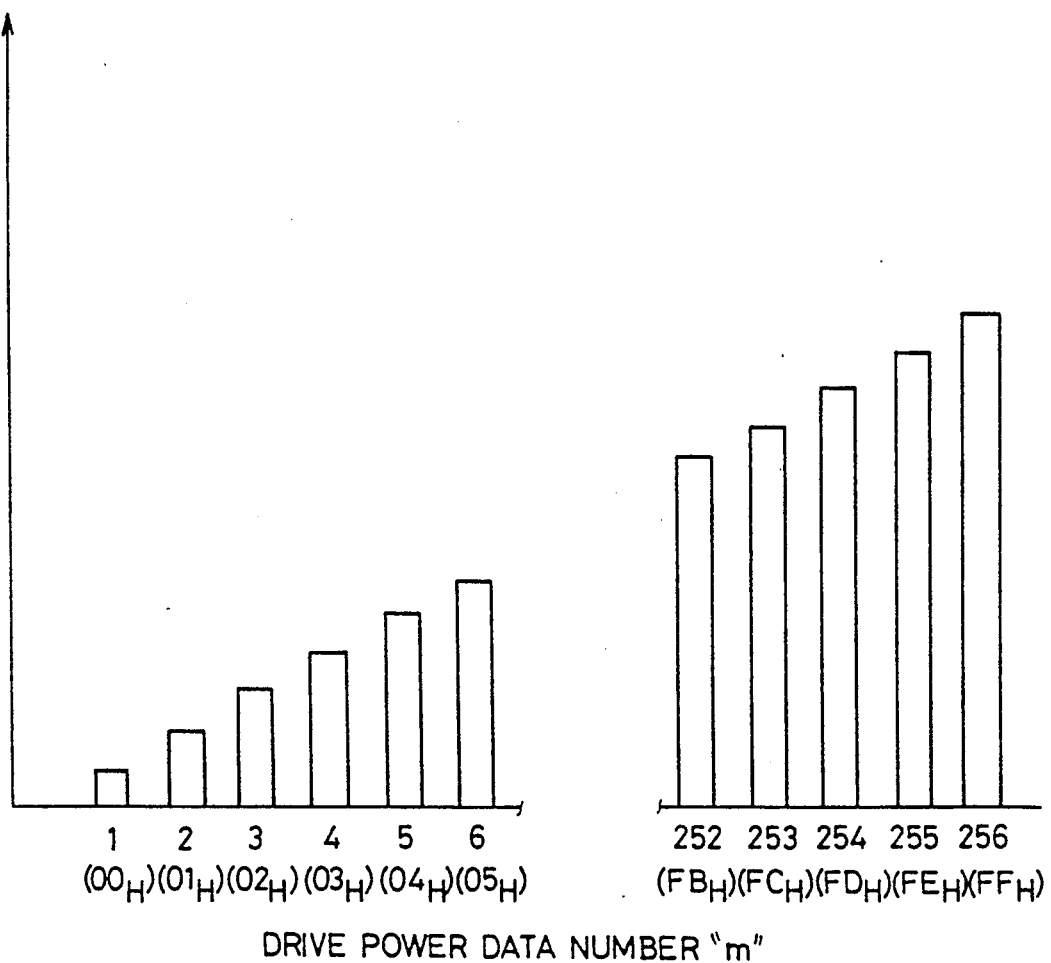

FIG.16

| REFERENCE DRIVE POWER DATA $w_m(j)$ | DECREMENTS -1 | INCREMENTS +2 | INCREMENTS +3 |
|---|---|---|---|
| 00~13 | -03 | 06 | 11 |
| 14~17 | -04 | 08 | 15 |
| 18~1B | -05 | 09 | 18 |
| 1C~1F | -05 | 0A | 1C |
| 20~23 | -06 | 0B | 20 |
| 24~27 | -07 | 0D | 23 |
| 28~2B | -08 | 0E | 27 |
| 2C~2F | -09 | 10 | 2B |
| 30~33 | -09 | 11 | 2E |
| 34~37 | -0A | 12 | 32 |
| 38~3B | -0B | 14 | 36 |
| 3C~3F | -0B | 15 | 3A |
| 40~43 | -0C | 16 | 3E |
| 44~47 | -0D | 18 | 41 |
| 48~4B | -0D | 19 | 45 |
| 8C~8F | -1A | 30 | 85 |
| 90~93 | -1B | 31 | 88 |
| 94~97 | -1B | 32 | 8C |
| 98~9B | -1C | 34 | 90 |
| 9C~FF | -1D | 35 | 94 |

OPTICAL READER HAVING APPARATUS FOR DISCRIMINATION BETWEEN DITHER-MATRIX AND NON-DITHER-MATRIX READING AREAS, AND/OR MEANS FOR DETERMINING LIGHT EMITTER DRIVE POWER VALUES BY USING REFERENCE REFLECTOR SURFACE

BACKGROUND OF THE INVENTION

1. Field of the Invention

The present invention relates in general to an optical reading apparatus used for image input and/or output devices such as facsimile systems, and more particularly to techniques for improving reading accuracy and reproducibility of images of a subject copy.

2. Discussion of the Prior Art

In an optical reader incorporated in a conventional facsimile transmitter or other types of an image input/output device, a subject copy is read in a bi-tone method wherein each reading spot is read as either "black" or "white" spot, the black and white spots being represented by respective two levels of a binary image signal. While this bi-tone reading method provides good reproducibility of characters such as letters, the method suffers from poor reproducibility of a photograph or other images which have a series of achromatic tones or a full range of gray scale from black to white. Namely, the local reading spots on a photograph which have different or varying achromatic tones are classified into black and white spots, with the tones compared with a predetermined threshold. Consequently, the photograph reproduced according to the image signals obtained by the optical reader cannot be perceived as a photograph having a shade variation. In the light of the above drawback, an optical reader capable of reading a gray scale image such as a photograph or picture is proposed. This optical reader is adapted to read a subject copy in a dither-matrix fashion wherein each reading spot on the entire area of the subject copy is read as a dither matrix of black and white dots, for example, 4×4 or 3×3 matrix of dots, so that the achromatic tone of the relevant reading spot is expressed as one of eight or sixteen different levels. This multi-tone or dither-matrix reading method provides improved reproducibility of photographs or other gray scale images.

However, the image-bearing surface of a subject copy frequently consists of both bi-tone areas bearing characters, and gray scale areas bearing photographs or other images having a shade variation. If this image-bearing surface is read in the bi-tone reading method, the reproducibility of the gray scale areas is not satisfactory for the reason described above. If the image-bearing surface is read in the dither-matrix method, the gray scale areas can be read with good reproducibility, while the bi-tone areas are read with some shade variation or different achromatic tones in the black or image portions such as letters. Sometimes, the boundaries between the reproduced letters and the white or non-image portions are unclear or indefinite, and the small-sized letters cannot be easily perceived.

One type of the optical reader capable of reading in the dither-matrix mode indicated above uses different threshold values with which comparators compare amounts or intensities of light beams which are reflected by adjacent local segments of a reading spot on the subject copy, in order to determine the level of binary image signals representative of the achromatic tone (black or white) in the respective local segments. The binary image signals of the adjacent local segments constitute dither-matrix pattern data of the reading spot. Described more specifically, a local segment having a given degree of achromatic tone is read as a white dot if the threshold value used for the comparator is relatively low, and is read as a black dot if the threshold value is relatively high. Consequently, the use of a plurality of different threshold values for the adjacent local segments of each reading spot makes it possible to represent the achromatic tone of the reading spot in a plurality of steps with a dither matrix pattern of the black and white local segments. Thus, the image-bearing surface may be read and reproduced in a dither-matrix or multi-tone mode.

In the meantime, the assignee of the present application proposed an optical reader as disclosed in U.S. Pat. No. 4,689,692 to Harano et al. corresponding to laid-open Publication No. 61-123357 of unexamined Japanese Patent Application, wherein each light-emitting element is driven by predetermined different amounts of drive power so that the light beams produced by the light-emitting element to irradiate the adjacent local segments of a reading spot have different intensities, so that dither-matrix pattern data may be prepared for the reading spot. In this case, the comparator uses a single threshold value. However, the physical properties and operating characteristics of the individual light-emitting elements for producing light beams are different and are chronologically changed, whereby the amounts or intensities of the light beams produced by the individual light-emitting elements may be different or inconsistent and are varied during the service life. Similarly, the output values of the individual light-sensitive elements connected to the comparators are not consistent and are chronologically varied. Therefore, the obtained dither-matrix pattern data or the image reproduced according to the dither-matrix pattern data suffers from insufficient reproducibility due to influences by the differences, variations and chronological changes of the optical elements.

To eliminate the adverse influence of the differences, variations and chronological changes of the optical elements on the reading accuracy of the optical reader, it has been proposed to use a suitable reflector member which has a reference reflector surface having a reference light reflectance value. By using the reflector member, the optimum amount of a light beam produced by each light-emitting element can be determined prior to an image reading operation, by adjusting the drive power applied to the light-emitting element so that the output value of a comparator producing an image signal reaches an optimum value when the reference reflector surface is irradiated by the light beam.

For example, a sheet holder member which cooperates with a reading surface of a reading head to hold a sheet of a subject copy is utilized as a reflector member having the reference reflector surface. The sheet holder member is supported movably toward and away from the reading surface of the reading head. The sheet holder member has a recessed portion formed in the surface facing the reading head. The bottom surface of the recessed portion serves as the reference reflector surface used for determining the optimum amount of the light beam produced by each light-emitting element. The sheet holder member is movable between its advanced position in which the reflector surface is irradiated upon determination of the optimum amount of the light beam, and its retracted position in which the sheet holder member functions to guide the sheet of a subject copy in cooperation with the reading head.

The reflector surface is provided on the bottom of the recessed portion, in order to prevent the reflector surface from being soiled by contact with the image-bearing surface of the subject copy. While this arrangement assures the maintenance of the predetermined light reflectance value of the reflector surface, the same arrangement results in a drawback. Described in more detail, the distance between the reflector surface and the reading surface of the reading head is different from the distance between the image-bearing surface of the subject copy and the reading surface of the reading head. This difference causes a difference between the optimum amount of a light beam (optimum amount of drive power to drive each light-emitting element) determined with respect to the reflector surface, and the optimum amount of the light beam which is actually used to irradiate the image-bearing surface of the copy sheet. In other words, the optimum amount determined by irradiating the reflector surface is not optimum for the actual reading of the copy sheet.

SUMMARY OF THE INVENTION

It is therefore a first object of the present invention to provide an apparatus for effecting discrimination between a dither-matrix reading area or gray scale area and a non-dither-matrix reading area or bi-tone area on a subject copy to be optically read, so that the dither-matrix reading area is read in a dither-matrix or multi-tone fashion while the non-dither-matrix reading area is read in a non-dither-matrix or bi-tone fashion.

It is a second object of the present invention to provide an optical reader which does not require the use and adjustment of different threshold values for determining the level of an image signal, and which assures sufficiently high reproducibility of a subject copy in a dither-matrix fashion, without being influenced by differences, variations and chronological changes of the optical elements such as light-emitting and light-sensitive elements.

A third object of the present invention is to provide an optical reader wherein an optimum amount of a light beam produced by each light-emitting element may be determined with improved accuracy, by utilizing a reference reflector surface that is spaced apart from the reading surface of the reading head.

The first object may be achieved according to the principle of the present invention, which provides an apparatus for effecting discrimination between a dither-matrix reading area and a non-dither-matrix reading area on a subject copy which is optically read, comprising irradiating means for irradiating local segments of an image-bearing surface of the subject copy with light beams having different intensities, reading means for receiving the light beams reflected from the local segments of the subject copy and obtaining image data representative of a presence or an absence of an achromatic tone in each of the local segments based on an amount of the light beam reflected by each local segment, reading control means for operating the irradiating means and the reading means to irradiate the local segments in a predetermined discrimination zone of the image-bearing surface, first with the light beam having a first intensity of the different intensities, and then with the light beam having a second intensity of the different intensities which is different from the first intensity, to obtain first image data and second image data, respectively, comparing means for comparing the first and second image data of each local segment in the predetermined discrimination zone, with each other, and determining whether the first and second image data agree with each other, or not, for each local segment, and discriminating means for determining that the discrimination zone is the dither-matrix reading area, if a degree of disagreement of the first and second image data of the discrimination zone exceeds a predetermined reference value, and determining that the discrimination zone is the non-dither-matrix reading area, if the degree of disagreement does not exceed the reference value.

In the instant apparatus of the present invention, the first image data of the local segments is obtained when the segments are irradiated with the light beam having the first intensity, while the second image data is obtained when the segments are irradiated with the light beam having the second intensity. The predetermined discrimination zone is determined as a gray scale or multi-tone area, i.e., the dither-matrix rading area if the degree of disagreement of the first and second image data of the discrimination zone exceeds a predetermined reference value. On the other hand, the discrimination zone is determined as a bi-tone area, i.e., the non-dither-matrix reading area if the degree of disagreement of the first and second image data does not exceeds the reference value. Hence, the gray scale or multi-tone areas such as photographs and pictures having a series of achromatic tones may be distinguished from the bi-tone areas such as ordinary characters.

By using the above apparatus, it is possible to provide an optical reader which is capable of reading a subject copy which bears both bi-tone areas and multi-tone areas. This image reader comprises the apparatus for effecting discrimination constructed as described above, first irradiation control means for operating the irradiating means to irradiate the local segments of the subject copy with respective radiations having different intensities, second irradiation control means for operating the irradiating means to irradiate the local segments of the subject copy with a radiation having a given intensity, and selector means for activating the first irradiation control means, if the discriminating means determines that the discrimination zone is the dither-matrix reading area, and activating the second irradiation control means, if the apparatus for effecting discrimination determines that the discrimination zone is the non-dither-matrix reading area.

In one form of the above optical reader, the discrimination zone consists of each one of a plurality of divisions of the image-bearing surface of subject copy. In this case, the discriminating means effects the determination between the dither-matrix reading area and the non-dither-matrix reading area for each one of the plurality of divisions. In this case, the gray scale areas and the bi-tone areas on the same image-bearing surface of a subject copy may be read in the corresponding suitable modes, i.e., in the dither-matrix reading mode and in the bi-tone reading mode, respectively. Thus, the instant apparatus assures comparatively high reproducibility of both the bi-tone areas such as ordinary characters, and the gray scale areas such as photographs and pictures, even where these bi-tone and gray scale areas exist on the subject copy.

In another form of the optical reader of the invention, the irradiating means includes at least one light-emitting element for irradiating the local segments of the subject copy, and the reading means includes at least one light-sensitive element for receiving the reflected light beams from the local segments and producing an output corresponding to an amount of each of the reflected light beams. The reading means further includes comparing means for comparing the output of the light-sensitive element with a first threshold value and thereby determining the presence or absence of the achromatic tone in the each local segment. The instant form of the optical reader further comprises reference power determining means for determining a reference value of drive power to drive each of the at least one light-emitting element, such that the output of a corresponding one of the at least one light-sensitive element reaches a predetermined second threshold value when each light-sensitive element receives a light beam which is emitted by the light-emitting element driven by the reference value of drive power and which is reflected by a reference reflector surface having a reference light reflectance value. The optical reader further comprises setting means for determining a plurality of set values of drive power for each light-emitting element, based on the reference value of drive power determined by the reference power determining means, and according to a predetermined relationship between the reference value and the plurality of set values. The second threshold value used by the reference power determining means may be equal to the first threshold value used by the reading means. The plurality of set values of drive power which are determined by the setting means may include the reference value of drive power determined by the reference power determining means.

In the above form of the invention, the predetermined relationship used by the setting means may be determined such that a difference between two adjacent values of the plurality of set values of drive power increases with the reference value of drive power.

In one arrangement of the same form of the invention, the optical reader further comprise a reading head, a sheet holder member, adjusting means and compensating means. The reading head has the above-indicated at least one light-emitting element and the above-indicated at least one light-sensitive element. The sheet holder member is disposed movably toward and away from the reading head and cooperates with the reading head to elastically hold a sheet of the subject copy therebetween. The sheet holder member has a recessed portion facing the reading head, and the recessed portion has a bottom surface which defines the reference reflector surface. The adjusting means is adapted to activate the reference power determining means to determine the reference value of drive power as a first reference value by irradiating the reference reflector surface, before the reading control means operates the irradiating means and the reading means to cause the reading head to read the image-bearing surface of the subject copy. The compensating means is adapted to compensate the first reference value of drive power determined by the adjusting means, according to a predetermined relationship between the first reference value and a second reference value of drive power which is obtained by activating the reference power determining means so as to irradiate a non-image area of the image-bearing surface of the sheet of the subject copy while the sheet is held between the reading head and the sheet holder member. When the image-bearing surface of the subject copy is read by the reading head, the light-emitting element is driven by the compensated first reference value of drive power. In this case, the optical reader may further comprise means for determining whether the irradiating means is irradiating the reference reflector surface of the sheet holder member or the non-image area of the image-bearing surface of the sheet of the subject copy.

In another arrangement of the above form of the invention, the reference power determining means includes power increasing means for increasing the drive power for each light-emitting element, and inhibiting means is provided for inhibiting the power increasing means from increasing the drive power if the output of the corresponding light-sensitive element does not reaches the predetermined second threshold value when the drive power is increased by the power increasing means to a predetermined level. When the inhibiting means is activated, suitable alarming means is activated to provide an alarm.

The second object described above may be accomplished according to a further aspect of the present invention, which provides an optical reader for reading an image-bearing surface of a subject copy, comprising irradiating means for irradiating local segments of the image-bearing surface of the subject copy, light-sensitive means for receiving light beams reflected by the local segments of the image-bearing surface, reading means for reading the image-bearing surface, based on the output of the light-sensitive means as compared with a first threshold value, reference power determining means for determining a reference value of drive power to drive the irradiating means, such that the output of the light-sensitive means reaches a predetermined second threshold value when the light-sensitive element receives a light beam which is emitted by the irradiating means by the reference value of drive power and which is reflected by a reference reflector surface having a reference light reflectance value, setting means for determining a plurality of set values of drive power for the irradiating means, based on the reference value of drive power determined by the reference power determining means, and according to a predetermined relationship between the reference value and the plurality of set values, and irradiation control means for driving the irradiating means by the plurality of set values of drive power, to irradiate the local segments of the subject copy with light beams having different intensities.

In the instant optical reader constructed as described above, the reference value of drive power to drive the irradiation means is determined by the reference power determining means, by irradiating the reference reflector surface. Therefore, the determined reference drive power does not include an influence due to variations or chronological changes of the physical properties and operating characteristics of the optical elements of the irradiating means and reading means. Further, the plurality of set values of drive power used for activating the irradiating means are determined based on the reference value of drive power determined as described above, and according to a predetermined relationship between this reference value and the set values to be determined. Therefore, the set values are not influenced by the variations and chronological changes of the physical properties and operating characteristics of the optical elements. The reference value may be used as one of the set values.

While the local segments of the subject copy are irradiated by the light beams having different intensities produced by the irradiating means driven with the determined set values of drive power, dither-matrix data pattern for a reading spot consisting of the adjacent local segments may be prepared in two different ways. Namely, the entire area of the reading spot may be irradiated at different times with the light beams having the different intensities. In this case, each of the image signals or sets of image data of the dither-matrix data pattern which correspond to the local segments of the reading spot is produced in relation to the irradiation of the reading spot with the corresponding light beam intensity. Alternatively, the adjacent local segments of the reading spot are irradiated with the light beams having the different intensities, respectively. In this case, the image signals are produced in relation to the irradiations of the individual local segments with the respective light beam intensities.

In one form of the optical reader according to the above aspect of the invention, the predetermined relationship set by the setting means to determine the set values of drive power is determined such that a difference between two adjacent values of the plurality of set values of drive power increases with the reference value of drive power.

The third object of the invention described above may be attained according to a still further aspect of the invention, which provides an optical reader for reading an image-bearing surface of a subject copy, comprising a reading head, a sheet holder member, reference power determining means, first control means, second control means, compensating means and drive means. The reading head includes light-emitting means for irradiating local segments of the image-bearing surface with light beams, and light-sensitive means for receiving the light beams reflected by the local segments and producing outputs corresponding to amounts of the reflected light beams. The sheet holder member is disposed movably toward and away from the reading head and cooperates with the reading head to elastically hold a sheet of the subject copy therebetween. The sheet holder has a recessed portion facing the reading head, and the recessed portion has a bottom surface which defines a reference reflector surface having a reference reflectance value. The reference power determining means is adapted to determine a reference value of drive power to drive the light-emitting means, such that the output of the light-sensitive means reaches a predetermined threshold value when the light-sensitive means receives a light beam which is emitted by the light-emitting means by the reference value of drive power and which is reflected by the reference reflector surface of the sheet holder member. The first control means is operated before an operation of the reading head to read the image-bearing surface, such that the light-emitting means faces the reference reflector surface. The first control means activates the reference power determining means to obtain the above-indicated reference value of drive power as a first reference value. The compensating means is adapted to compensate the first reference value of drive power, according to a predetermined relationship between the first reference value of drive power, and a second reference value of drive power which is to be obtained if the reference power determining means is activated with the light-emitting means facing a non-image area of the sheet of the subject copy while the sheet is held between the reading head and the sheet holder member. The drive means drives the light-emitting means by the compensated first value of drive power, while the image-bearing surface of the subject copy is read by the reading head.

In the instant optical reader of the invention constructed as described above, the first reference value of drive power, i.e., the reference value of drive power determined by the reference power determining means by using the reference reflector surface is compensated to determine the optimum drive power for actually driving the light-emitting means during an image reading operation. This compensation is made according to the predetermined relationship between the first reference value, and the second reference value which is to be obtained if the light-emitting means is activated to irradiate the non-image area of the subject copy sheet. This arrangement eliminates an error of the optimum value of drive power which would arise due to a difference between the distance of the reflector surface to the reading head and the distance of the image-bearing surface of the subject copy sheet to the reading head. Namely, the light-emitting means is energized by the optimum drive power, i.e., the compensated first value of drive power.

In one form of the above aspect of the invention, the optical reader further comprises relationship determining means which includes second control means operable before the operation of the first control means, for activating the reference power determining means to obtain the reference value of drive power as a third reference value, third control means operable before the operation of the first control means, for activating the reference value of drive power as a fourth reference value, and means for determining a relationship between the third and four reference values of drive power, to determine the predetermined relationship between the first and second references values of drive power. In this instance, the relationship between the first and second reference values of drive power to drive the light-emitting means may be determined by a ratio of the third reference value obtained by the second control means, to the fourth reference value obtained by the third control means.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which:

FIG. 7 is a flow chart showing an operation to determine a reference value of the drive power for each light-emitting element;

FIGS. 8(A) through 8(D) are flow charts showing an operation to read the image-bearing surface of the subject copy;

FIGS. 9(A) through 9(D) are illustrations explaining a manner of effecting discrimination between a dither-matrix reading area and a non-dither-matrix reading area on the image-bearing surface;

FIGS. 10(A), 10(B) and 10(C) are also illustrations showing the details of the area discriminating operation of FIGS. 9(A) through 9(D);

FIGS. 14(A) through 14(F) are flow charts showing an operation of the embodiment of FIG. 12;

FIG. 15 is a graph corresponding to that of FIG. 3, showing the drive power data used in the embodiment of FIG. 12;

FIG. 16 is a table showing a relationship to obtain three reference drive power values based on a determined reference drive power value for each light-emitting element;

DETAILED DESCRIPTION OF THE PREFERRED EMBODIMENTS

Figure 1:
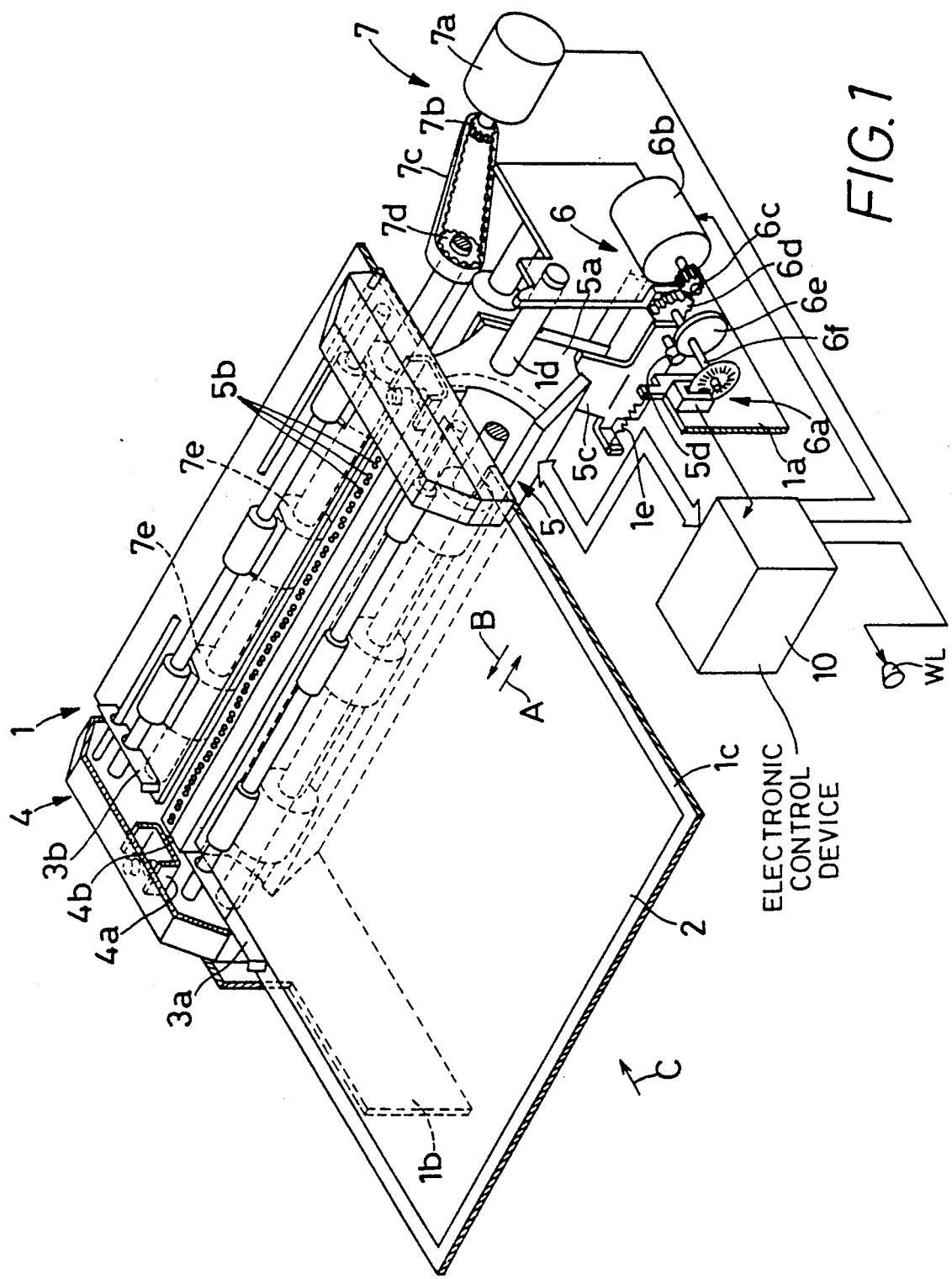
FIG. 1 is a perspective view of one embodiment of an optical reader of the present invention.

Referring first to FIG. 1, reference numeral 1 generally denotes an optical reader equipped with a support plate $1c$ which extends between right and left side frames $1a$, $1b$. The support plate $1c$ has two sheet guides $3a$, $3b$ secured at its left end, to register a subject copy in the form of an original copy sheet 2 such that the left edge of the copy sheet 2 is in abutting contact with the sheet guides $3a$, $3b$. The front part of the support plate $1c$ is covered by a top frame 4, which has a sheet holder plate $4a$ which extends in the direction of width of the copy sheet 2, so as to cover the entire width of the sheet 2. The sheet holder plate $4a$ has a bottom surface $4b$ which serves as a reference reflector surface having a predetermined value of light reflectance. This reference reflector surface $4b$ is used to establish a reference value of drive power to drive each light-emitting element, as described below.

The left and right side frames $1a$, $1b$ support a support shaft $1d$ extending therebetween parallel to the sheet holder plate $4a$. The support shaft $1d$ supports a shuttle type reading head 5 such that the reading head 5 is slidably reciprocated on the support shaft $1d$ in the longitudinal direction of the support shaft $1d$, i.e., in an image reading direction. The reading head 5 includes a body $5a$ to which each light-emitting optical fiber Tij (FIG. 2) and each light-receiving optical fiber Rij (FIG. 2) are fixed at their one end, for optically reading an image on an image-bearing surface of the copy sheet 2.

Figure 2:
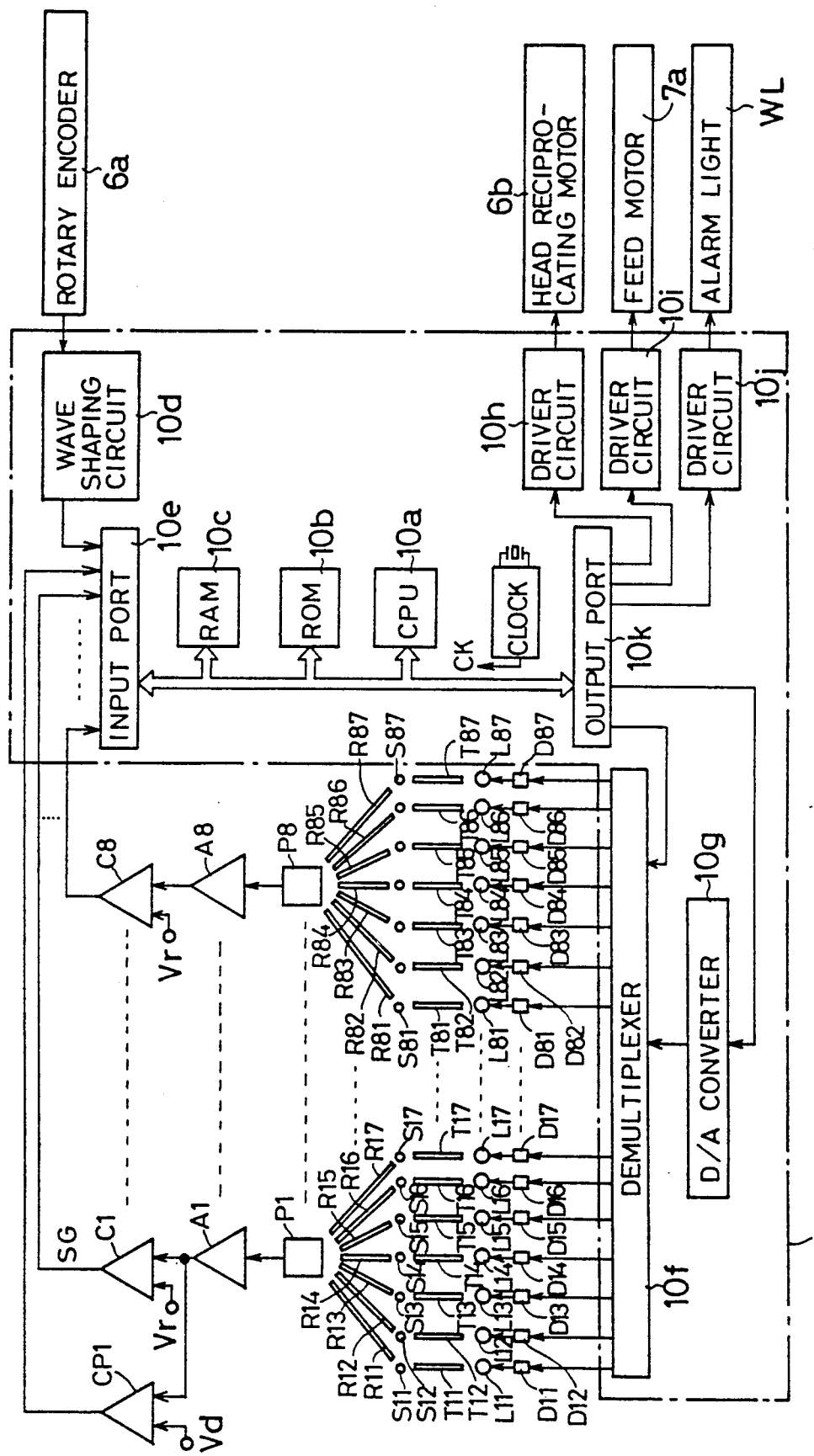
FIG. 2 is a schematic block diagram showing a control system of the image reader of FIG. 1.

The reading head 5 further includes a printed-circuit board assembly which includes light-emitting elements in the form of light-emitting diodes Lij, light-sensitive elements in the form of light-sensitive phototransistors Pi, and other electronic components, as illustrated in FIG. 2. The reading head 5 has a total of 56 reading portions $5b$ which are arranged in spaced-apart relation with each other in the image reading reflector surface $4b$ of the sheet holder plate $4a$. Each reading portion $5b$ includes the light-emitting end of the appropriate light-emitting optical fiber Tij and the light-receiving end of the appropriate light-receiving optical fiber Rij.

To the right end of the shuttle type reading head 5, there is fixed a bracket $5c$ which is biased toward the right side frame $1a$, by a spring $1e$ attached at its ends to the bracket $5c$ and frame $1a$. Thus, the reading head 5 is biased in the direction indicated by arrow A in FIG. 1. On the right surface of the right side frame $1a$, there is provided a head reciprocating mechanism indicated generally at 6 in FIG. 1. The head reciprocating mechanism 6 includes an eccentric peripheral cam $6e$ which engages a cam follower $5d$ secured to the bracket $5c$, so that the reading head 5 is reciprocated in the opposite directions indicated by arrows A and B in FIG. 1. The mechanism 6 includes a rotary encoder $6a$ for detecting reading spots on the image-bearing surface of the copy sheet 2 while the reading head 5 is reciprocating to read the image on the copy sheet. The mechanism 6 employs a head reciprocating motor $6b$, a rotary motion of which is imparted to the eccentric peripheral cam $6e$ through a driving gear $6c$ fixed to the output shaft of the motor $6b$, a driven gear $6d$ meshing with the driving gear $6c$, and a drive shaft $6f$ which connects the driven gear $6d$ to the peripheral cam $6e$. The rotary encoder $6a$ has a rotary disk secured to the drive shaft $6f$. With the motor $6b$ operated, the cam follower $5d$ is moved by an eccentric rotary motion of the peripheral cam $6e$, whereby the reading head 5 is reciprocated to incrementally move the 56 reading portions $5b$ in the image reading direction parallel to the direction of width of the copy sheet 2.

The original copy sheet 2 (subject copy to be optically read by the instant optical reader) is fed on the plate $1c$ by a sheet feeding mechanism 7, in a direction perpendicular to the image reading direction or direction of reciprocation of the reading head 5. The feeding mechanism 7 includes a drive motor $7a$, a driving gear $7b$, a toothed endless belt $7c$, a driven gear $7d$, and feed rolls $7e$, so that the copy sheet 2 is fed by rotation of the feed rolls $7e$, in the feeding direction indicated at C in FIG. 1.

The instant optical reader 1 is controlled by a control system illustrated in detail in the schematic block diagram of FIG. 2. The control system includes an electronic control device 10 for controlling diode drivers Dij for driving the light-emitting diodes Lij, and processing electric output signals generated by light-sensitive means which includes the phototransistors Pi indicated above. The light-sensitive means further includes amplifiers Ai connected to the phototransistors Pi, and comparators Ci connected to the amplifiers Ai. The 56 reading portions $5b$ correspond to 56 reading spots Sij which are irradiated by respective light beams produced by the respective light-emitting diodes Lij and emitted from the ends of the light-emitting optical fibers Tij. The light beams reflected by the respective reading spots Sij are received by the light-receiving optical fibers Rij and transmitted to the appropriate phototransistors Pi. In the present embodiment, there are provided a total of eight phototransistors Pi, and each phototransistor Pi receives the reflected light beams transmitted by the seven light-receiving optical fibers Rij. In other words, the reading head 5 has eight optical units each having seven light-emitting diodes Lij and one light-sensitive phototransistor Pi. Reference numeral "i" indicates the identification number of the optical units, and reference numeral "j" indicates the identification number of each optical component (D, L, T and R) of each optical unit.

An output signal of each phototransistor Pi upon incidence of a light beam reflected by the appropriate reading spot Sij is amplified by the corresponding amplifier Ai, and the amplified signal is applied to one input of the corresponding comparator Ci, so that the applied signal is compared with a reading threshold voltage Vr (first threshold value), 1.5 V for example, which is applied to another input of the comparator Ci. The comparator Ci produces a binary image signal SG representative of the presence or absence of an achromatic tone of each reading spot Sij. The image signal SG is fed to the electronic control device 10.

The output signal of each phototransistor Pi amplified by the amplifier Ai is also applied to a second comparator CPi and compared with a copy sheet detection voltage Vd (second threshold value), 3 V for example, in order to determine whether the appropriate reading spot Sij is on the image-bearing surface of the copy sheet 2, or on the reference reflector surface 4b of the sheet holder member plate 4a. A binary output signal generated by the comparator CPi is also applied to the control device 10.

The electronic control device 10 includes: a central processing unit (CPU) 10a for controlling the head reciprocating motor 6b, sheet feeding motor 7a and diode drivers Dij and processing various input signals such as the image signal SG from the reading head 5, according to a signal from the rotary encoder 6a and a control program; a read-only memory (ROM) 10b for storing the above-indicated control program, and other control data such as drive power data to drive the light-emitting diodes Lij; and a random-access memory (RAM) 10c for temporarily storing the input signals, and arithmetic results obtained during an image reading operation.

The control device 10 further includes a wave shaping circuit 10d for shaping the signal from the rotary encoder 6a, and an input port 10e through which the CPU 10a receives the signal from the wave shaping circuit 10d and the signals SG from the comparators Ci. The signals from the comparators CPi are also applied to the input port 10e.

Further, the control device 10 includes a drivers Dij for energizing the light-emitting diodes Lij of the reading head 5; a D/A converter 10g connected to the demultiplexer 10f, for converting digital signals representative of current values to be applied to the diodes Lij, into corresponding analog signals fed to the demultiplexer 10f; a driver circuit 10h for driving the head reciprocating motor 6b; a driver circuit 10i for driving the sheet feeding motor 7a; a driver circuit 10j for driving an alarm light WL; and an output port 10k connected to the above-indicated components 10f-10j.

When the optical reader 1 is initially turned on, the reference value of drive power for each light-emitting diode Lij is established by using the reference reflector surface 4b provided on the sheet holder plate 4a. This procedure is effected to compensate for a variation in the output levels of the phototransistors Pi due to different physical and operating characteristics of the light-emitting diodes Lij, light-emitting and light-receiving optical fibers Tij, Rij and phototransistors Pi, even if the light-emitting diodes Lij are driven by a same amount of drive power. Namely, each of the diodes Lij is energized with an electric current applied thereto, and the amount or intensity of a light beam emitted by the diode Lij and reflected by the reflector surface 4b is detected as an output value of the corresponding phototransistor Pi. The amount of electric current applied to the diode Lij is increased until the output value of the phototransistor Pi reaches a predetermined reference or optimum level. Thus, the reference or optimum amounts of current to be applied to the individual diodes Lij are determined such that all the transistors Pi produce the same output values when the reflector surface 4b is irradiated. The data representative of the optimum current values for the diodes Lij, i.e., drive power data for each diode Lij are stored in the RAM 10c.

Then, the head reciprocating motor 6b is activated to reciprocate the shuttle type reading head 5 for performing an image reading operation of the original copy sheet 2.

As the reading head 5 is incrementally moved, the light-emitting diodes L1j (j = 1 through 7) of the first optical unit are sequentially energized in order to irradiate the corresponding reading spots S1j (j = 1 through 7). The outputs of the phototransistor P1 representative of the intensities of the light beams reflected by the reading spots S1j are compared with the copy sheet detection voltage Vd, by the comparator CP1. This comparison is accomplished to determine whether the reading portions 5b of the reading head 5 face the reflector surface 4b of the sheet holder plate 4a or the image-bearing surface of the original copy sheet 2, more precisely, whether the leading end the image-bearing surface reaches the reading portions 5b or reading spots Sij irradiated by the reading portions 5b. The binary output signals of the comparator CP1 are stored in the RAM 10c. If the output signals of the comparator CP1 indicate that the light beams emitted from the reading portions 5b are reflected by the reflector surface 4b, the sheet feeding motor 7a is activated to feed the copy sheet 2 by a predetermined vertical-scanning incremental distance, for example 0.125 mm. This incremental feeding of the copy sheet 2 is repeated until the output signals of the comparator CP1 indicate that the emitted light beams are reflected by the image-bearing surface of the copy sheet 2, that is, until the leading end of the image-bearing surface of the sheet 2 reaches an array of the reading portions 5b of the reading head 5.

When the copy sheet 2 is fed by a sufficient distance as indicated above, the left end portion of the reflector surface 4b adjacent to the sheet guides 3a, 3b are covered by the leading end portion of the copy sheet 2. As a result, the output values of the comparator CP1 are lowered below a predetermined limit, whereby the arrival of the leading edge of the copy sheet 2 at the reading portions 5b of the head 5 can be detected. The number of the vertical-scanning feeding movements of the sheet 2 is stored in the RAM 10c. Then, the first horizontal scanning of the image-bearing surface of the copy sheet 2 is initiated. Namely, the reading head 5 is moved a predetermined distance such that the reading spots Sij provided by the reading portions 5b are moved in the image reading direction, so as to cover the entire width of the copy sheet 2. In the present embodiment, each reading spot Sij (each reading portion 5b) has eight different positions per one millimeter of travel of the reading head 5 in the image reading direction parallel to the axis of the support shaft 1d. Further, the reading head 5 is moved a distance of 4 mm per one horizontal scanning movement in the image reading direction. Since a total of seven reading spots Sij (reading portions 5b) are provided for each phototransistor Pi, the phototransistor Pi provides a total of 224 output values ($7 \times 4 \times 8$) during one horizontal-scanning movement of the reading head 5.

During the horizontal-scanning movement of the reading head 5, the light-emitting diodes Lij are energized by the reference or optimum current values determined by utilizing the reflector surface 4b, as described above. The light beams emitted by the diodes Lij are reflected by the appropriate reading spots Sij, and the output values of the comparators Ci are compared with the reading threshold voltage Vr, so that the binary image signals SG produced by the comparators Ci represent the presence or absence of the achromatic tone of the reading spots Sij, i.e., have two states corresponding to "black" and "white". Thus, the one line of image on the image-bearing surface is optically read, and the image signals SG are stored in the RAM 10c such that the image signals SG correspond to local segments of the image-bearing surface of the copy sheet 2. Then, the next image line is horizontally scanned by the reading head 5.

The light-emitting diodes Lij are driven by the reference or optimum value of electric current determined by irradiating the reflector surface 4b as described above, where the reading head 5 reads a bi-tone image such as ordinary characters in a non-dither-matrix fashion. However, the diodes Lij are driven by four different values of electric current, where the reading head 5 reads a picture or photograph which has a series of achromatic tones having varying proportions of white and black or shade variation, so as to provide a full range of grays in a dither-matrix fashion. The manner of determining the sets of drive power data $w_m$(i, j) representative of the electric current values to energize the light-emitting diodes Lij will be described below.

The ROM 10b stores diode selecting data $x_i$, $y_j$ indicative of the diode drivers Dij (i = 1 through 8, j = 1 through 7), and the drive power data $w_m$(i, j) representative of the electric current values applied from the diode drivers Dij to the respective diodes Lij. To establish the four different values of electric current applied to the diodes Lij to read the image in a dither-matrix fashion, the CPU 10a executes a control routine as illustrated in the flow chart of FIG. 7.

Initially, the CPU 10a executes step S1 to select diode selecting data $x_l$, $y_l$ and drive power data $w_1$. Then, the control flow goes to step S2 wherein the reading portions 5b of the reading head 5 are aligned with the reference reflector surface 4b of the sheet holder plate 4a. Step S2 is followed by step S3 in which the CPU 10a retrieves the diode selecting data $x_l$ from the ROM 10b, and applies the retrieved data $x_l$ to the demultiplexer 10f. Then, the control flow goes to step S4 in which the CPU 10a retrieves the diode selecting data $y_l$ from the ROM 10b, and applies the received data $y_l$ to the demultiplexer 10f.

Figure 3:
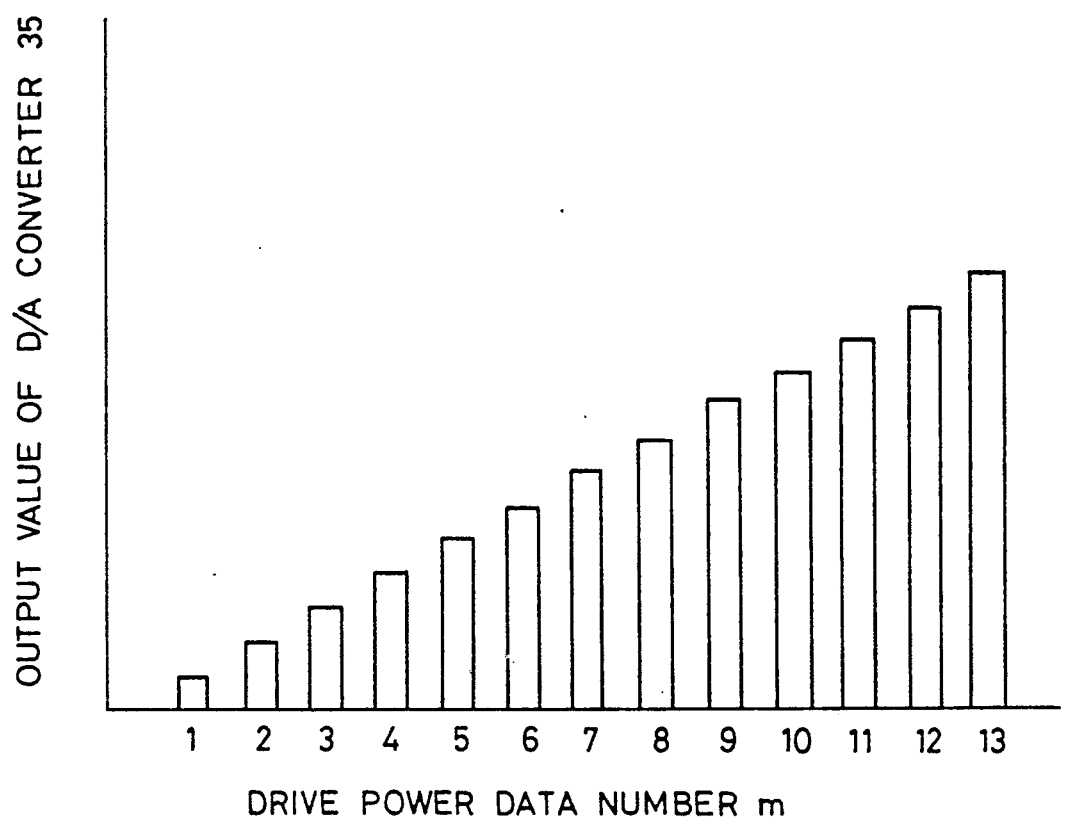
FIG. 3 is a graph showing a relationship between an output value of a D/A converter and number of drive power data used to drive light-emitting elements of a reading head of the reader.

In the next step S5, the CPU 10a retrieves the drive power data $w_m$(m = 1, when the present control routine is executed for the first time) and applies the retrieved data $w_m$ to the D/A converter 10g. In this specific example, the drive power data $w_m$ is $w_l$ as indicated in FIG. 3, and the drive power data $w_l$ is applied to the diode driver D11 from the D/A converter 10g, whereby the diode driver D11 applies the electric current to the corresponding diode L11, according to the drive power data $w_l$. As a result, the diode L11 produces a light beam which irradiates the reading spot S11 on the reflector surface 4b, through the corresponding light-emitting optical fiber T11. The phototransistor P1 receives the light beam reflected by the reading spot S11, through the corresponding light-receiving optical fiber R11. An output of the phototransistor P1 is applied to the amplifier A1, and the amplified output is applied to the comparator C1. The comparator C1 compares the received output of the phototransistor P1 with the predetermined reading threshold voltage Vr. The binary image signal SG generated by the comparator C1 is fed to the CPU 10a of the control device 10.

Then, the CPU 10a implements step S6 to determine whether the level of the received image signal SG is high or not. If the level of the image signal SG is not high, step S6 is followed by step S7 in which the CPU 10a determines whether the presently selected drive power data $w_m$ is $w_{10}$, or not. If the present drive power data $w_m$ is not $w_{10}$, step S7 is followed by step S8 in which the next drive power data $w_{m+1}$ is selected. Namely, the drive power data number m is incremented in step S8. As a result, the drive power data $w_2$ is selected, and this data $w_2$ is retrieved from the ROM 10b and applied to the D/A converter 10g, in step S5. Thus, steps S5, S6, S7 and S8 are repeatedly executed while incrementing the drive power data number m, until the level of the image signal SG becomes high in step S6. If the level of the image signal SG does not become high for some reason or other even after the drive power data $w_{10}$ has been selected and executed, the present control routine is terminated, and the driver 10j is activated to turn on the alarm light WL, informing the operator that the instant optical reader 1 is defective.

When the CPU 10a determines in step S6 that the level of the IMAGE signal SG is high, the control flow goes to step S9 in which the presently selected drive power data $w_m$ is stored in the RAM 10c, as first optimum drive power data $w_m$ (1, 1) for the light-emitting diode L11. Then, the control flow goes to step S10 in which the CPU 10a retrieves from the ROM 10b the drive power data $w_{m+1}$ next to the presently selected or first optimum drive power data $w_m$, and stores this drive power data as second optimum drive power data $w_{m+1}$ (1, 1) for the diode L11. Similarly, the CPU 10a retrieves from the ROM 10b the drive power data $w_{m+2}$ and $w_{m+3}$ next to the data $w_{m+1}$ and stores these data in the RAM 10c, as third and fourth optimum drive power data $w_{m+2}$ (1, 1) and $w_{m+3}$ (1, 1) for the same diode L11. Thus, the four sets of drive power data are determined for activating the diode driver D11 to drive the diode L11 so that the intensity of the light beam produced by the diode L11 is changed in four steps for reading a photograph or picture in the dither-matrix manner.

Then, the CPU 10a goes to step S11 to determine whether the number (j) of the diode selecting data $y_j$ is 7 or not, namely, whether the presently selected diode L1j of the first optical unit of the head 5 is L17 (last diode of the optical unit) or not. If a negative decision (NO) is obtained in step S11, the control flow goes to step S12 in which the next diode of the first optical unit is selected. That is, the number "j" is incremented. Step S12 is followed by steps S3 and S4 described above. In this specific example wherein step S11 is executed for the first time, the diode selecting data $y_2$ is retrieved from the ROM 10b in step S4, and applied to the demultiplexer 10f. Then, step S5 is executed to apply the drive power data $w_l$ to the D/A converter 10g to activate the diode driver D12, for driving the diode L12 by the drive current corresponding to the drive power data $w_1$. Steps S5-S12, S3 and S4 are repeatedly executed to store in the RAM 10c the first, second, third and fourth sets of drive power data $w_m(1, 2)$, $w_{m+1}(1, 2)$, $w_{m+2}(1, 2)$ and $w_{m+3}(1, 2)$ for the diode L12, and further the four sets of drive power data $w_m(1, j)$, $w_{m+1}(1, j)$, $w_{m+2}$ and $w_{m+3}(1, j)$ for the diodes L1j where $j = 3$ through 7. Thus, the four sets of drive power data for the seven diodes L1j of the first optical unit are determined.

When an affirmative decision (YES) is obtained in step S11, the control flow goes to step S13 to determine whether the number (i) of the presently selected diode selecting data $x_i$ is "8" or not. Namely, step S13 is effected to determine whether the above-described determination of the drive power data has been completed for all of the eight optical units of the reading head 5. If a negative decision (NO) is obtained in step S13, step S14 is effected to select the next optical unit, namely, to increment the number "i" of the diode selecting data x Steps S3-S14 are executed until an affirmative decision (YES) is obtained in step S13, that is, until the four sets of drive power data $w_m(i, j)$, $w_{m+1}(i, j)$, $w_{m+2}(i, j)$ and $w_{m+3}(i, j)$ have been determined for all of the light-emitting diodes Lij of the reading head 5.

The above manner of determination of the drive power data $w_m(i, j)$ for the diodes Lij eliminates otherwise possible differences or variations in the output values of or between the phototransistors Pi due to different operating characteristics and chronological changes of the diodes Lij, optical fibers Tij, Rij and phototransistors Pi.

Figure 4:
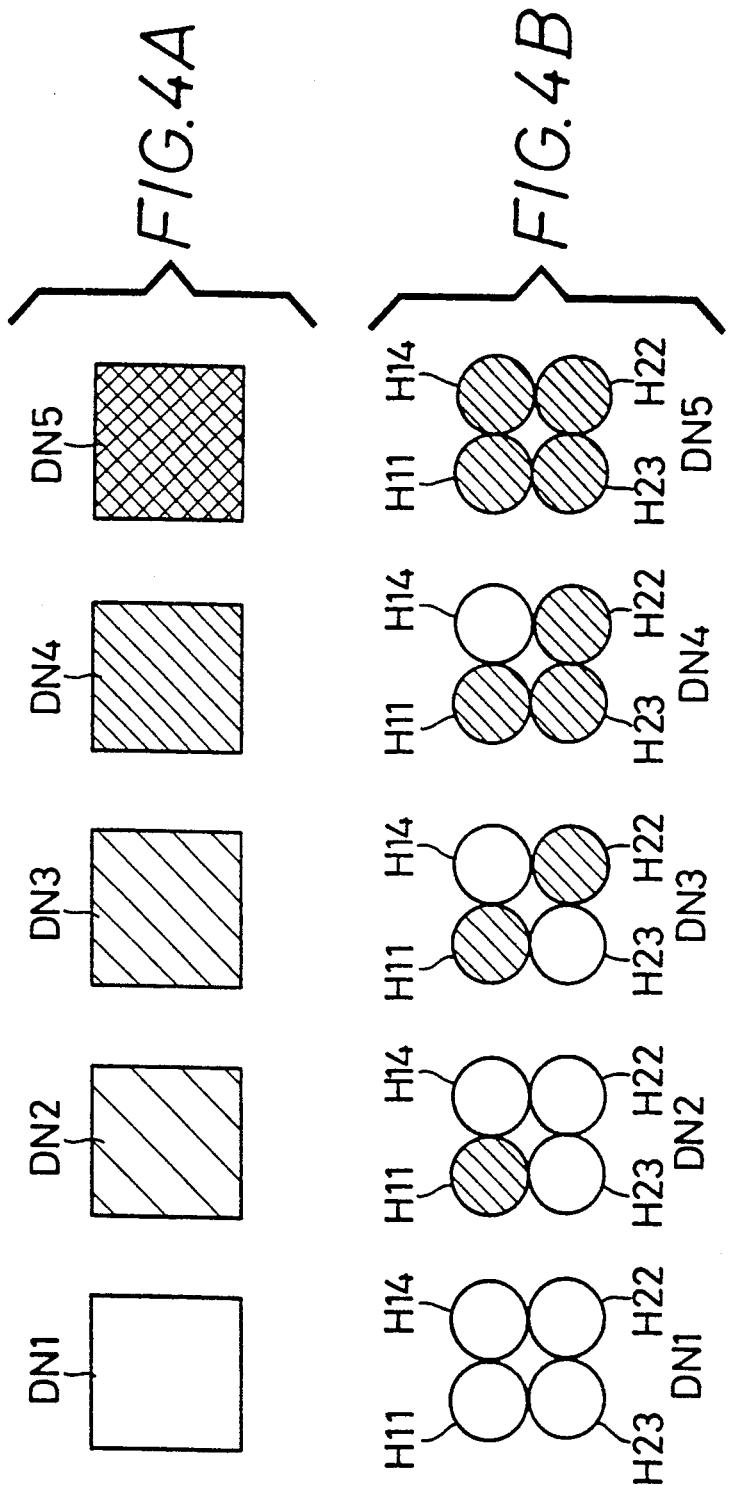
FIG. 4(A) and 4(B) show relationships between different achromatic tones of local segments of an image-bearing surface of a subject copy, and corresponding dither-matrix arrangements.
Figure 5:
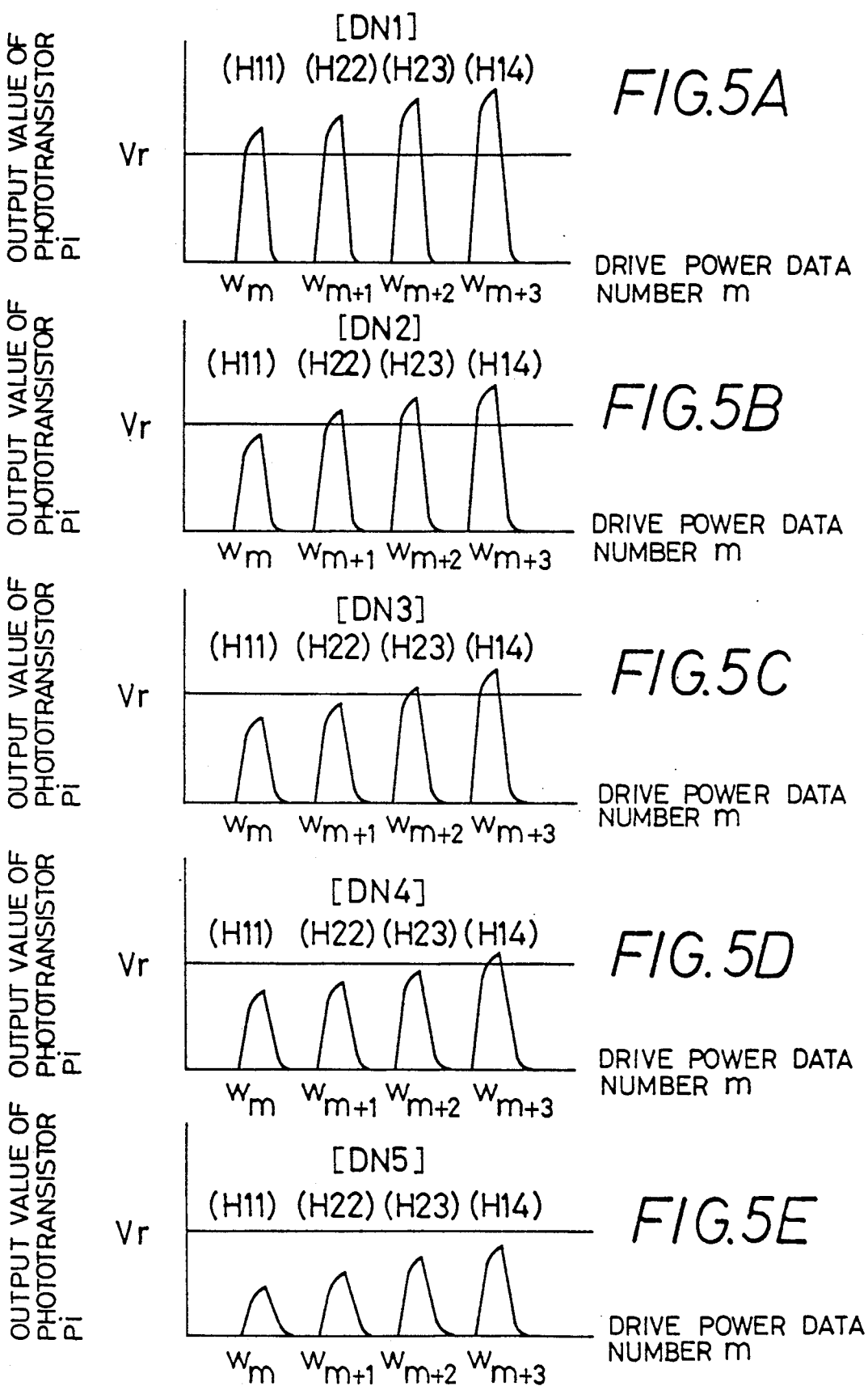
FIGS. 5(A) through 5(E) are graphs illustrating relationships between the D/A converter output value and the drive power data number, which correspond to the different local segments of the image-bearing surface.

With the four sets of drive power data $w_m(i, j)$, $w_{m+1}(i, j)$, $w_{m+2}(i, j)$ and $w_{m+3}(i, j)$ stored in the RAM 10c for each light-emitting diode Lij, a picture, photograph or other image area which has a shade variation or a series of achromatic tones may be read by the reading head 5 in the dither-matrix fashion, the principle of which will be described below referring to FIGS. 4(A), 4(B), FIGS. 5(A)-(E) and FIG. 6. It is supposed that each reading area DNn shown in FIG. 4(A) consists of four local segments or reading spots $H_{11}$, $H_{22}$, $H_{23}$ and $H_{14}$. These four reading spots are irradiated by respective light beams of different intensities which are emitted by a light-emitting diode Lij with the four sets of drive power data $w_m(i, j)$, $w_{m+1}(i, j)$, $w_{m+2}(i, j)$ and $w_{m+3}(i, j)$. As indicated in each of FIGS. 5(A)-(E), the output value of the phototransistor Pi increases as the drive power data number "m" increases in steps, that is, as the amount of electric current applied to the diode Lij increases. At the same time, the output value of the phototransistor Pi decreases as the achromatic tone of the reading area DNn increases, that is, as the number "n" of the reading areas DNn increases. It will be understood that the reading areas DN1, DN2, DN3, DN4 and DN5 correspond to FIGS. 5(A), 5(B), 5(C), 5(D) and 5(E), respectively. If the reading threshold voltage Vr of the comparator Ci is set at the level indicated in FIG. 5, the reading areas $DN_1$ through $DN_5$ as shown in FIG. 4(A) are read as indicated in FIG. 4(B), in which the hatched reading spots are read as black spots while the non-hatched reading spots are read as white spots (having no achromatic tone).

Figure 6:
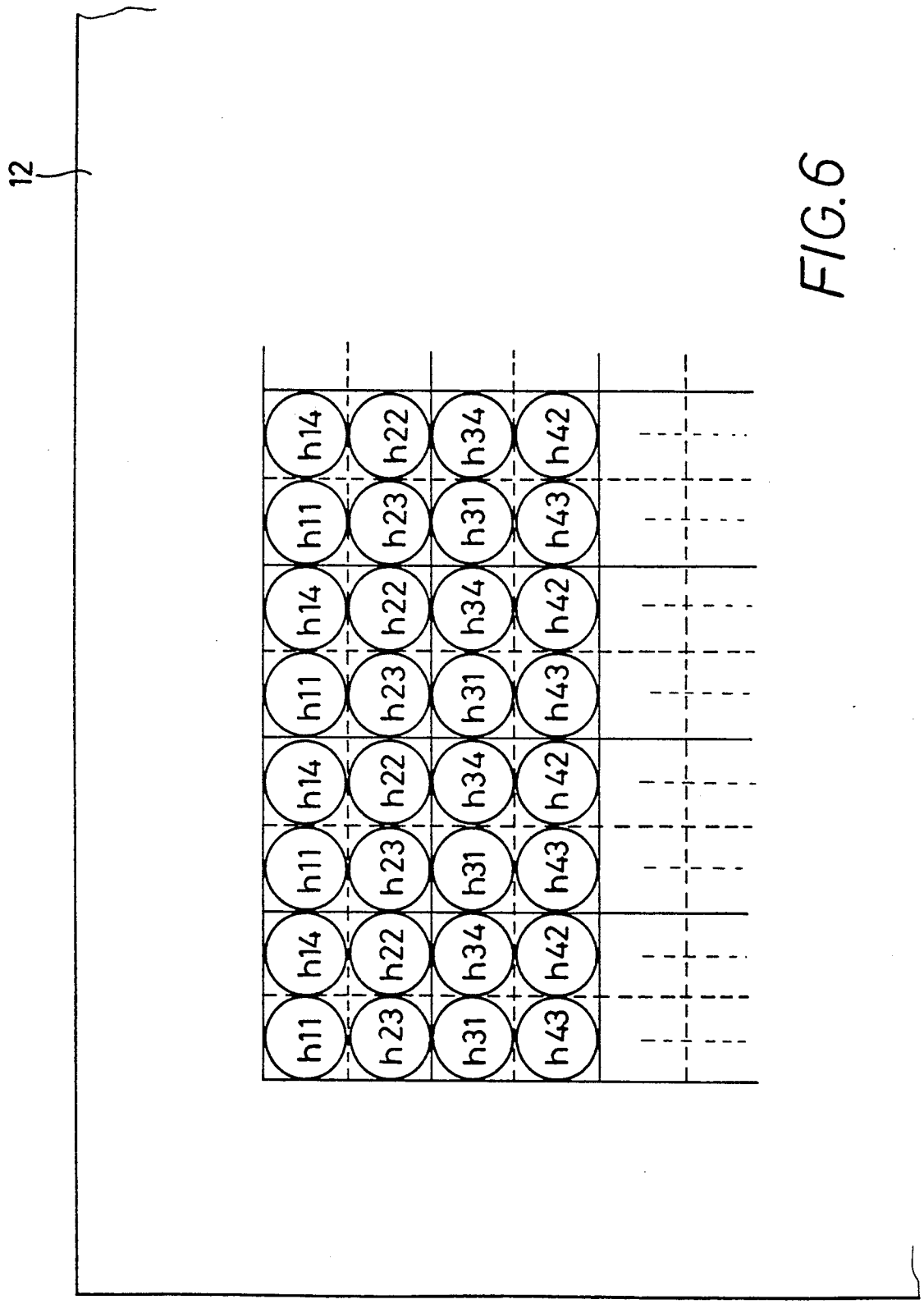
FIG. 6 is an illustration indicating dither-matrix pattern data stored in a random-access memory of the control system.

If the above manner of reading the local segments is applied to the entire area of the image-bearing surface of the original copy sheet 2, there is obtained a batch of dither-matrix pattern data as indicated in FIG. 6, wherein $h_{11}$, $h_{22}$, $h_{23}$ and $h_{14}$ represent four sets of discrimination data representative of the presence or absence of achromatic tone, i.e., black and white. The discrimination data $h_{11}$, $h_{22}$, $h_{23}$ and $h_{14}$ correspond to the reading spots $H_{11}$, $H_{22}$, $H_{23}$ and $H_{14}$, respectively. In FIGS. 4(B) and 6, the first one of the two subscript numerals following letter "H" or "h" indicates the number of the horizontal scanning line on the image-bearing surface of the copy sheet 2, which is currently read, while the second subscript numeral indicates one of the four sets of drive power data $w_m(i, j)$, $w_{m+1}(i, j)$, $w_{m+2}(i, j)$ and $w_{m+3}(i, j)$ which is used to irradiate the appropriate reading spot.

Referring next to the flow chart of FIGS. 8(A) through 8(D), the dither-matrix reading operation will be described in detail. Upon activation of a suitable start switch of the optical reader 1, the CPU 10a executes step S101 of FIG. 8(A) wherein the number "p" of the horizontal scanning line of the original copy sheet 2 is set to "1". Step S101 is followed by step S102 in which the reading head 5 is positioned to the reading start position on the image-bearing surface of the copy sheet 2. Then, the control flow goes to step S103 to select the diode selecting data x , $y_j$ to $x_l$, $y_l$, and step S104 to retrieve the selected data $x_i$, $y_j$ ($x_l$, $y_l$ in this first control cycle) from the ROM 10b and apply the retrieved data $x_i$, $y_j$ to the demultiplexer 10f. The CPU 10a then implements step S105 wherein the drive power data $w_m(i, j)$ is retrieved from RAM 10c and the retrieved drive power data is applied to the D/A converter 10g. As a result, the light-emitting diode Lij (L11 in this first control cycle) is driven to produce a light beam whose intensity corresponds to the drive power data $w_m(1, 1)$, whereby the reading spot $H_{11}$ is irradiated by the light beam. The light beam reflected by the reading spot $H_{11}$ is received by the phototransistor Pi (Pl in this case), and an output voltage of the phototransistor Pi is applied to the comparator Ci (Cl in this case). The output voltage is compared with the predetermined reading threshold voltage Vr. In the next step S106, the image signal SG produced by the comparator Ci is stored in the RAM 10c, as discrimination data $h_{pl}$.

Then, the control flow goes to step S107 to determine whether the number "j" is equal to "7" or not. If a negative decision (NO) is obtained in step S107, the control flow goes to step S108 wherein the number "j" is incremented, and steps S104 through S107 are repeated until an affirmative decision (YES) is obtained in step S107. Thus, the reading of the reading spot $H_{11}$ by the light beams emitted by the seven light-emitting diodes L1j connected to the phototransistor Pl is completed. When the number "j" becomes equal to "7", step S107 is followed by step S109 to determine whether the number "i" is equal to "8" or not. If a negative decision is obtained in step S109, step S110 is implemented to increment the number "i". Then, steps S104 through S109 are repeated until the number "i" reaches "8". Thus, the reading of the reading spot $H_{11}$ by all of the eight phototransistors Pi is completed. In other words, the reading by all of the 56 light-emitting diodes Lij of the eight optical units is completed.

Subsequently, the control flow goes to step S111 of FIG. 8(B) wherein the reading head 5 is moved in the image reading direction by a predetermined incremental distance. Steps S112 through S119 are then implemented repeatedly, so that the reading of the reading spot $H_{14}$ by all of the 56 diodes Lij is completed. In this reading operation, the drive power data $w_{m+3}(i, j)$ is used to drive the diodes Lij. Thus, the discrimination data $h_{p4}$ is prepared.

If an affirmative decision (YES) is obtained in step S118, step S120 is executed to determine whether the number "q" is equal to "16" or not. The number "q" indicates the number of readings of the pair of reading spots $H_{11}$, $H_{14}$ with one horizontal scanning movement (4 mm) of the reading head 5. It is noted that each of the reading spots $H_{11}$, $H_{14}$ is read 16 times by activation of each light-emitting diode Lij while the reading head 5 is moved along each horizontal scanning line. If the number "q" is not equal to "16", step S121 is executed to increment the number "q", and step S122 is implemented to move the head 5 by the predetermined incremental distance (0.125 mm). Then, the control flow goes back to step S103 of FIG. 8(A). At the end of the first horizontal scanning line, an affirmative decision (YES) is obtained in step S120, and the control flow goes to step S123 wherein the copy sheet 2 is fed by the predetermined incremental distance (0.125 mm). Subsequently, step S124 is implemented to increment the number "p", to read the next horizontal scanning line.

Figure 8A:
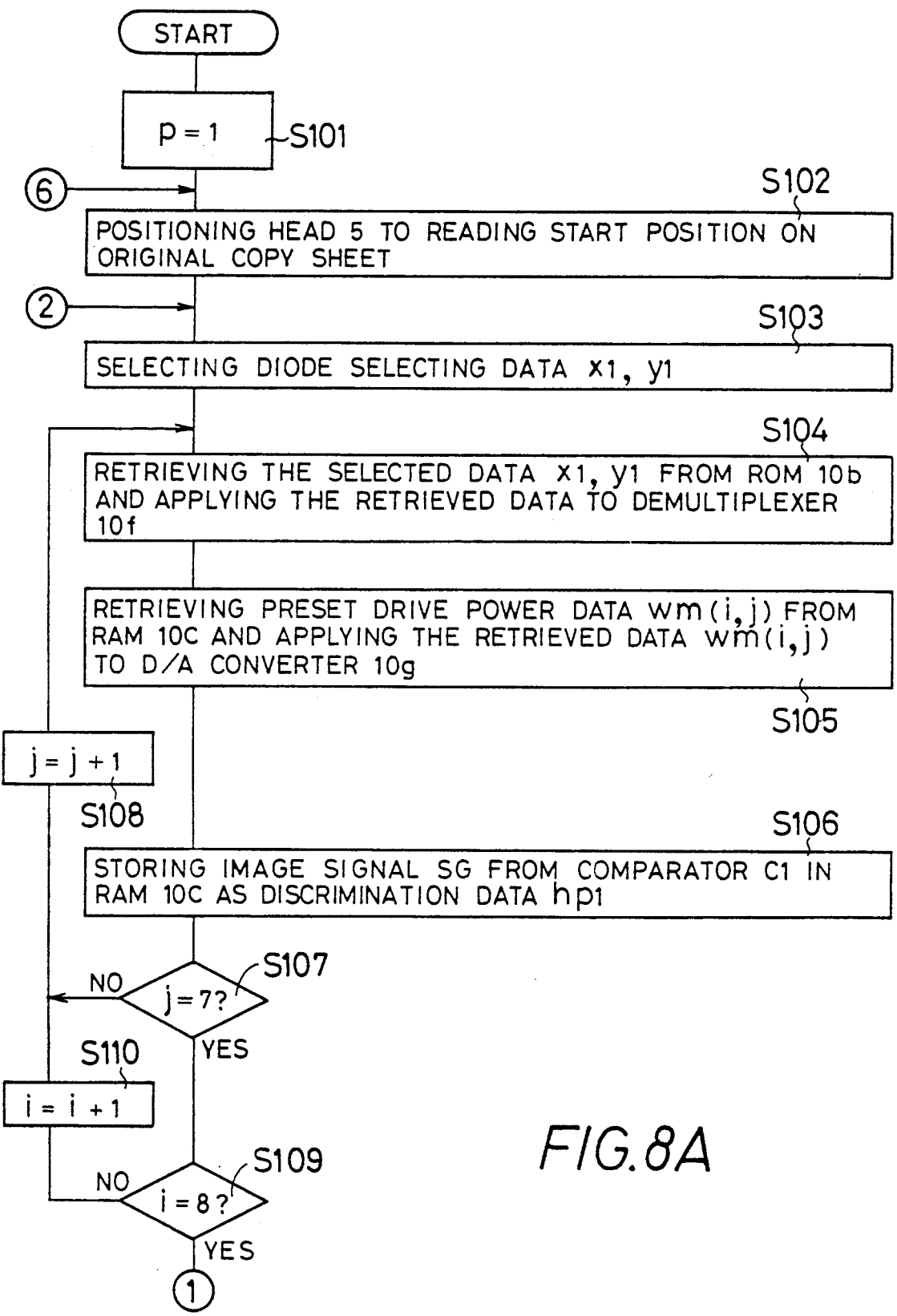
Figure 8C:
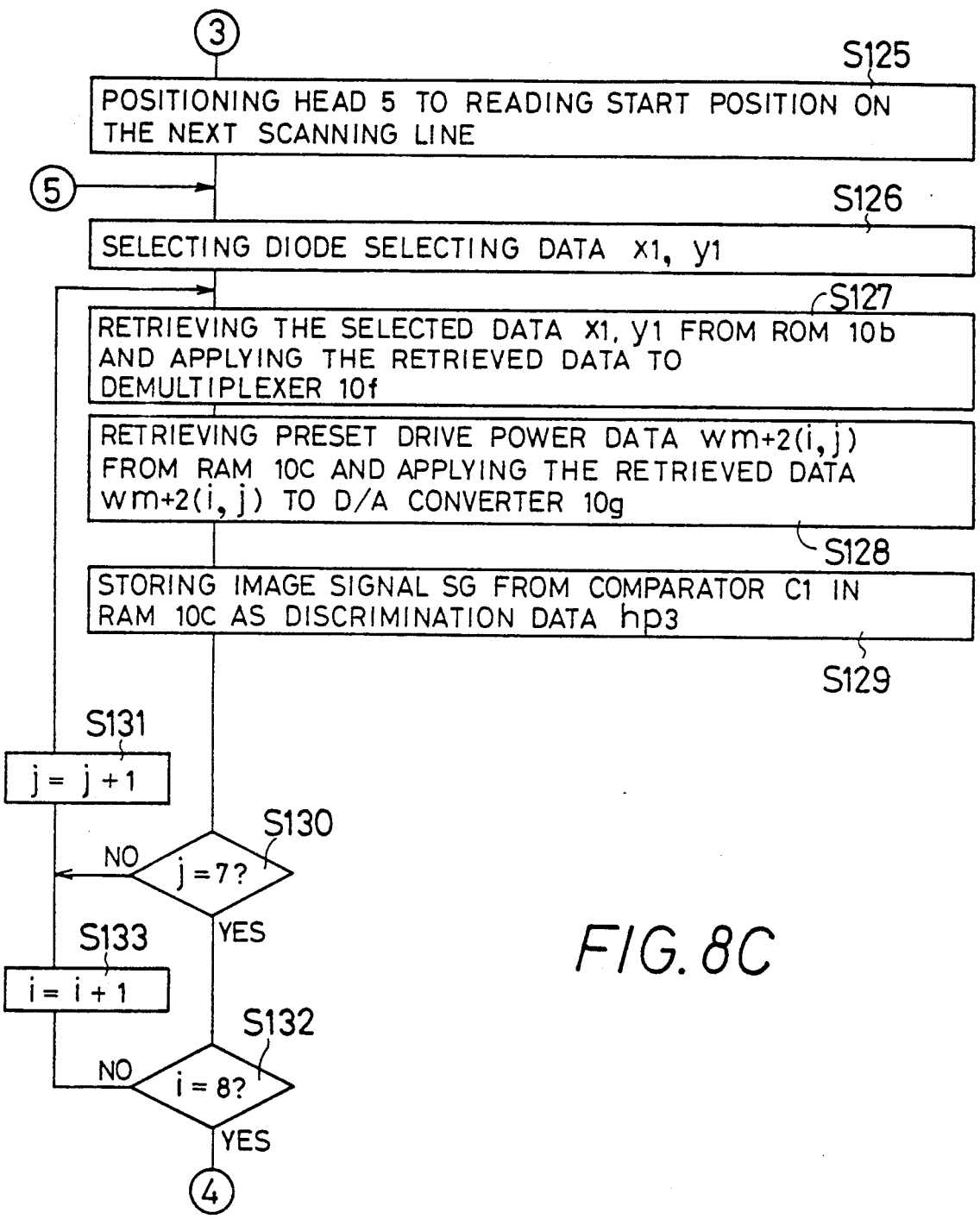

Successively, the control flow goes to step S125 of FIG. 8(C) to position the head 5 to the predetermined reading start position on the copy sheet 2, and steps S127 through S133 are repeatedly executed to effect reading of the reading spot $H_{23}$ to prepare the discrimination data $h_{p3}$. Similarly, steps S136–S142 of FIG. 8(D) are repeatedly executed after execution of steps S134 and S135, whereby the discrimination data $h_{p2}$ of the reading spot $H_{22}$ is prepared.

Step S144 is repeatedly executed to increment the number "q" until an affirmative decision (YES) is obtained in step S143. That is, the reading head 5 is moved by the predetermined incremental distance and the control flow goes back to step S126 of FIG. 8(C), and the above-indicated operation is performed until an affirmative decision (YES) is obtained in step S143, namely, until the reading of the second horizontal scanning line is completed.

Then, the control flow goes to step S146 wherein the prepared discrimination data $h_{11}$, $h_{14}$, $h_{23}$ and $h_{22}$ for the read two horizontal scanning lines are re-arranged into dither-matrix pattern data. Step S147 is then implemented to determine whether the reading of the last horizontal scanning line is completed, or not. If not, step S148 is executed to feed the copy sheet 2 by the predetermined incremental distance, and step S149 is executed to increment the number "p". The control flow then goes back to step S102. An affirmative decision (YES) is obtained in step S147 at the end of the reading of the last scanning line of the copy sheet 2.

While the flow chart of FIGS. 8(A) through 8(D) shows the reading operation in a dither-matrix mode adapted to read a gray scale area of the image-bearing surface of the copy sheet 2 which has a series of achromatic tones or shade variation (full range of gray scale between black and white), the instant optical reader 1 is capable of reading an image-bearing surface which includes both a bi-tone (black and white) area and a gray scale area. Described more specifically, the instant optical reader 1 is adapted to effect discrimination between the gray scale or multi-tone area (dither-matrix reading area) and the bi-tone area (non-dither-matrix reading area), so that the gray scale area is read in the dither-matrix mode with four different sets of drive power data for the light-emitting diodes Lij, as described above, while the bi-tone area is read in the non-dither-matrix mode with only one set of drive power data for the diodes Lij.

The discrimination between the bi-tone or non-dither-matrix reading area and the mutli-tone or dither-matrix reading area will be described by reference to FIGS. 9(A) through (D) and FIGS. 10(A), 10(B) and 10(C). FIG. 9(A) illustrates an image-bearing surface of a subject copy which includes a bi-tone area containing black characters "FAX", and a multi-tone area containing a photograph which has a series of achromatic tones from black to white. When the predetermined reading spots on a horizontal scanning line indicated in FIG. 9(A) are read with the light-emitting diodes Lij driven with the drive power data $w_m(i, j)$, the comparator Ci produces an image signal SG1 as indicated in FIG. 9(B). Similarly, the reading spots on the same scanning line are read with the diodes Lij driven with the drive power data $w_{m+3}(i, j)$. In this instance, the comparator Ci produces an image signal SG2 indicated in FIG. 9(C).

Usually, reading spots on black characters without a shade variation are read as black dots even when the intensity of a light beam irradiating the spots is considerably varied. On the other hand, reading spots on a relatively black part of a photograph having a shade variation may be read as white dots when the intensity of the light beam is increased beyond a certain limit. In the present example, consequently, the image signals SG1 and SG2 agree with each other for the substantially entire portion of the bi-tone area (characters "FAX"), but the image signals SG1 and SG2 do not agree with each other for a considerably large portion of the multi-tone or gray scale area (photograph), as indicated in FIGS. 9(B) and 9(C).

In the light of the above fact, it may be presumed that the disagreement of the image signals SG1 and SG2 indicates a mutl-tone or gray scale area such as a photograph or picture. Thus, the discrimination between the bi-tone area (characters) and the multi-tone area (photograph) may be effected by irradiating the image-bearing surface with light beams having different intensities, i.e., by driving the light-emitting diodes Lij with different sets of drive power data representative of different amounts of electric current applied to the diodes Lij.

Figure 11:
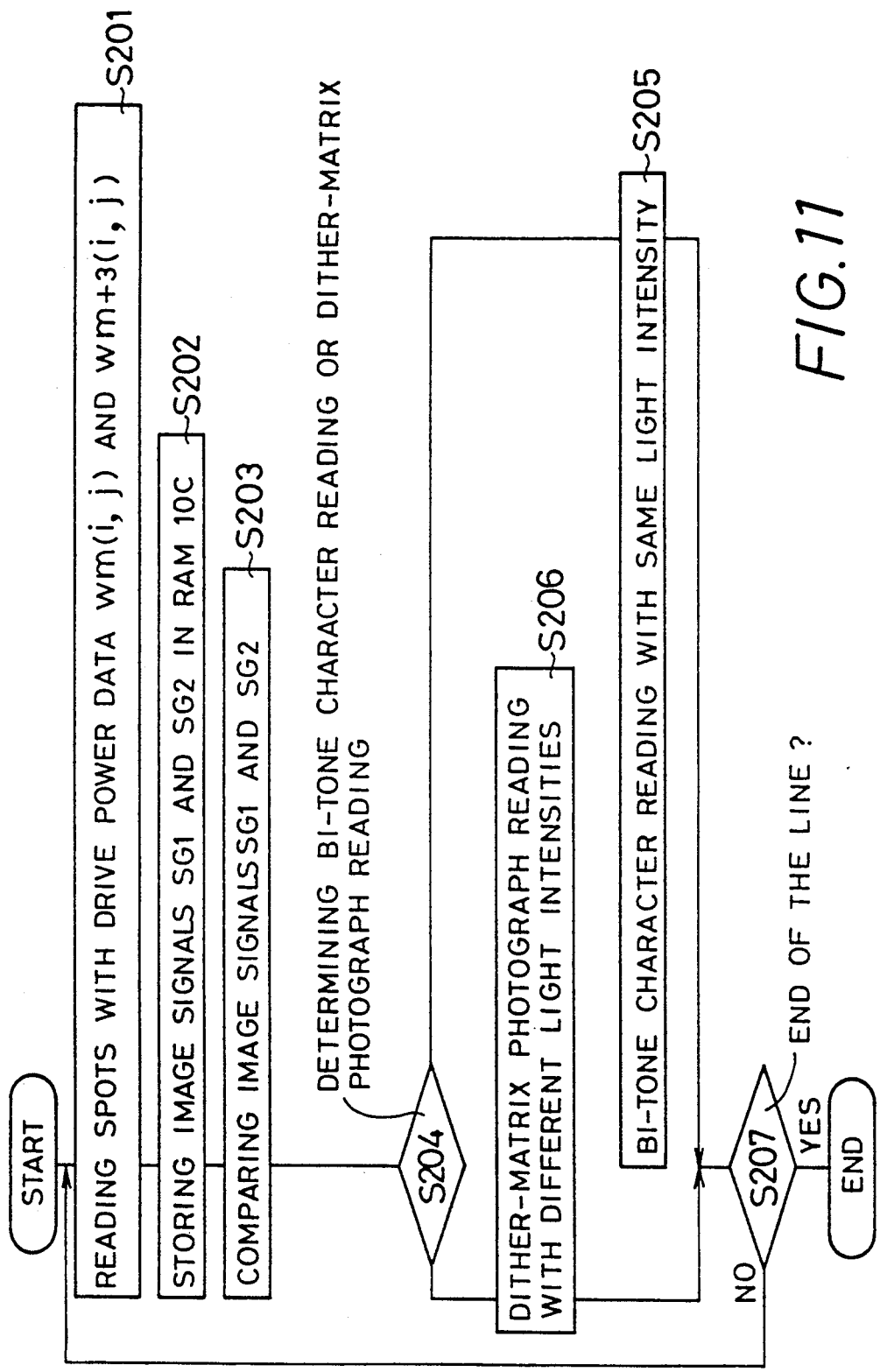
FIG. 11 is a flow chart illustrating an image reading operation in a dither-matrix reading mode and a non-dither-matrix reading mode.

This aspect of the discrimination of the image-bearing surface will be further described by reference to FIGS. 10(A), 10(B) and 10(C) and FIG. 11. As indicated in FIG. 10(A), a certain discriminating zone (2 mm length) is set on the image-bearing surface of a subject copy. Within this predetermined discriminating zone of 2 mm length, there are provided a total of 16 reading spots. In this case, a control routine of FIG. 11 is executed, wherein the reading spots are read in step S201, with the light-emitting diodes Lij driven first with the drive data $w_m(i, j)$, and then with the drive data $w_{+3}(i, j)$. This reading operation may be performed by repeating steps S102–S111 described above. The obtained image signals SG1 and SG2 are stored in the RAM 10c in step S202, and compared with each other in step S203. Then, in step S204, the CPU 10a determines whether the disagreement of the image signals SG1 and SG2 occurs for more than five (5) spots of the total of 16 reading spots, or not (namely, whether the more than five black spots are erroneously read as white spots, or not). If a negative decision is obtained in step S204, step S205 is effected to read the relevant discriminating zone of 2 mm length in the bi-tone or non-dither-matrix reading mode. If an affirmative decision is obtained in step S204, step S206 is implemented to read the relevant discriminating zone in the multi-tone or dither-matrix reading mode. Steps S201–S026 are repeatedly executed until the reading of the relevant scanning line is completed, i.e., until an affirmative decision is obtained in step S207.

Where the achromatic tone of the bi-tone area or characters is relatively low, it is desirable that the reading threshold voltage Vr of the comparator Ci is increased to assure more accurate reading of the black and white spots.

Figure 12:
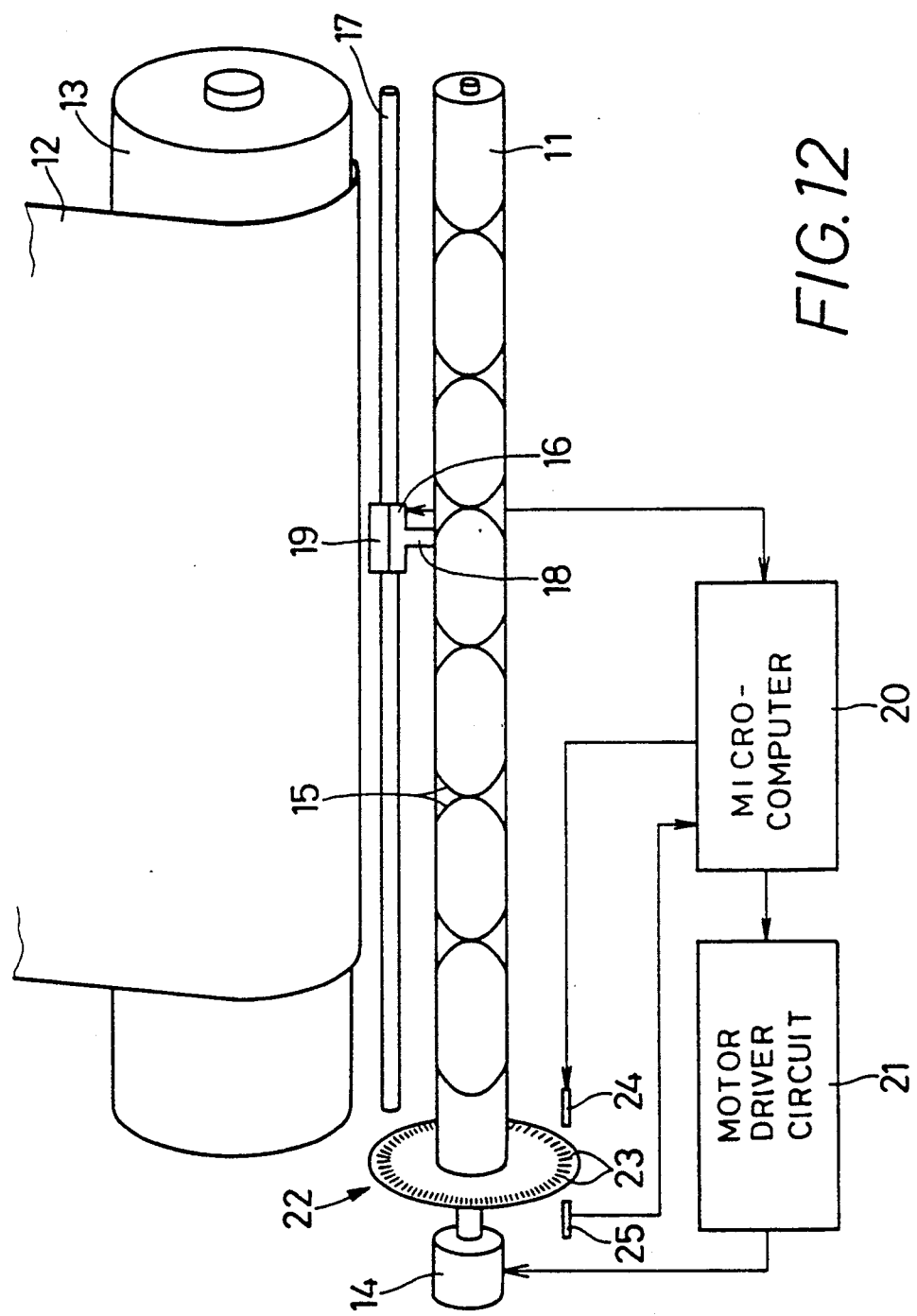
FIG. 12 is a perspective view of another embodiment of the present invention.
Figure 13:
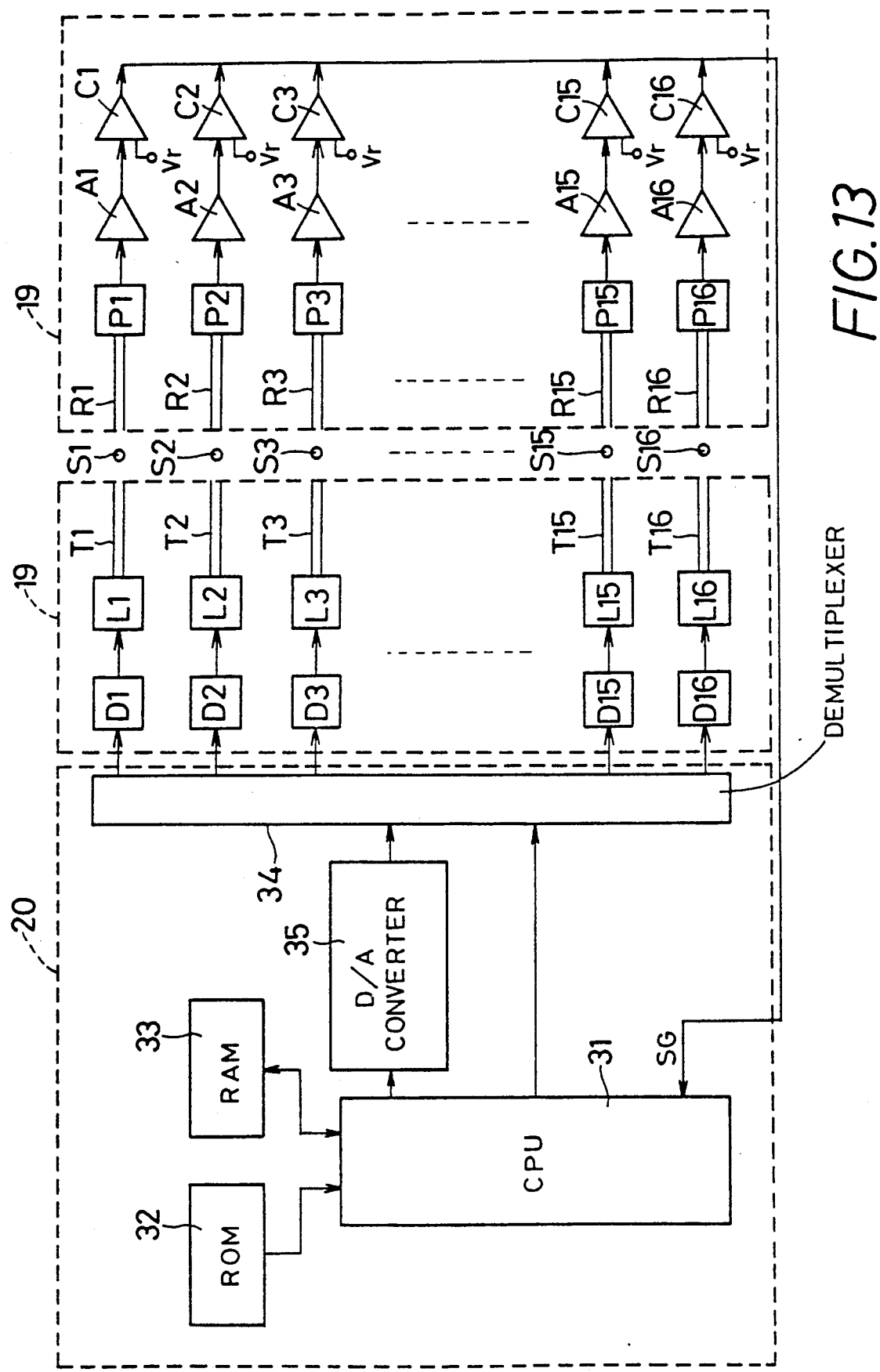
FIG. 13 is a schematic block diagram corresponding to that of FIG. 2, illustrating the control system of the embodiment of FIG. 12.

Referring next to FIGS. 12 and 13, another embodiment of the present invention will be described. In FIG. 12, reference numeral 11 denotes a drive shaft which is disposed so as to extend parallel to a sheet support drum 13 for supporting and feeding an original copy sheet 12. The drive shaft 11 is connected at its one end to a DC drive motor 14, and has a spiral cam groove 15 formed in its circumferential surface. A guide rod 17 is disposed between the drive shaft 11 and the sheet support drum 13, so as to extend parallel to these shaft and drum 11, 13. The guide rod 17 slidably supports a carrier 16 which carries a reading head 19 fixed thereon. The carrier 16 is provided with a cam follower 18 which engages the spiral cam groove 15 formed in the drive shaft 11, so that the reading head 19 is reciprocated with the carrier 16 in an image reading direction parallel to the guide rod 17, when the drive shaft 11 is rotated by the drive motor 14. The drive motor 14 is driven through a driver circuit 21 under the control of a microcomputer 20 which will be described.

The reading head 19 has an array of reading portions which is arranged so as to face the image-bearing surface of the copy sheet 12. The reading portions are equally spaced apart from each other in the direction of feed of the copy sheet 12. The operation of the reading head 19 is controlled by the microcomputer 20.

A rotary encoder disk 22 is fixed at the end of the drive shaft 11 to which the drive motor 14 is connected. The rotary encoder disk 22 has a multiplicity of radial slits 23 which are equally spaced apart from each other in the circumferential direction. On the opposite sides of the disk 22, there are disposed a light-emitting element 24 and a light-sensitive element 25, so that a light beam emitted by the light-emitting element 24 may be received by the light-sensitive element 25, through the slit 23 aligned with the elements 24, 25. The output of the light-sensitive element 25 is fed to the microcomputer 20. Thus, the rotation of the drive shaft 11 is detected so that the reading head 19 is controlled in timed relation with its incremental movement.

The reading head 19 and the microcomputer 20 will be described in more detail, by reference to the schematic block diagram of FIG. 13.

The reading head 19 has sixteen light-emitting diodes L1–L16, which are driven by respective drivers D1–D16 controlled by a demultiplexer 34 of the microcomputer 20, as described below.

The light-emitting diodes L1–L16 are optically coupled to the light-receiving ends of respective light-emitting optical fibers T1–T16. The light-emitting ends of the optical fibers T1–T16 are positioned in a straight row perpendicular to the direction of movement of the reading head 19. The light beams emitted from the light-emitting optical fibers T1–T16 are incident upon respective reading spots S1–S16 on the image-bearing surface of the copy sheet 12.

Adjacent to the light-emitting ends of the light-emitting optical fibers T1–T16, there are positioned the light-receiving ends of light-receiving optical fibers R1–R16, so that the light beams reflected by the reading spots S1–S16 may be received by the light-receiving optical fibers R1–R16.

The other ends of the light-receiving optical fibers R1–R16 are optically coupled to respective light-sensitive elements P1–P16, so that the light beams reflected by the reading spots S1–S16 are received by the light-sensitive elements P1–P16, which produce output signals proportional to the amounts or intensities of the incident light beams. The output signals of the light-sensitive elements P1–P16 are amplified by respective amplifiers A1–A16.

The amplified output signals of the light-sensitive elements P1–P16 are applied to respective comparators C1–C16. Each of the comparators C1–C16 also receives a reading threshold voltage Vr, with which the output signal of the light-sensitive element Pj is compared. When the level of the output signal of the element Pj is higher than that of the threshold voltage Vr, the comparator Cj produces a high-level image signal SG, which is fed to a CPU 31 of the microcomputer 20. When the level of the output signal of the element Pj is lower than that of the threshold voltage Vr, the comparator Cj produces a low-level image signal SG, which is also fed to the CPU 31. The high-level image signal SG indicates a comparatively large amount of the light beam reflected by the appropriate reading spot Sj, which indicates a relatively low degree of achromatic tone in the reading spot. On the other hand, the low-level image signal SG indicates a comparatively small amount of the light beam reflected by the appropriate reading spot Sj, which indicates a relatively high degree of achromatic tone in the reading spot. Thus, the image signals of the comparators C1–C16 based on the outputs of the light-sensitive elements P1–P16 represent one of two levels (black and white) of the achromatic tone in the respective reading spots S1–S16.

The CPU 31 of the microcomputer 20 is connected to a ROM 32 and a RAM 33. The CPU 31 operates to control the reading operation of the instant optical reader, according to a control program stored in the ROM 32, while utilizing a temporary data storage function of the RAM 33, as described below.

The CPU 31 is also connected to a demultiplexer 34 for applying an analog drive power signal selectively to the drivers D1–D16, through a D/A converter 35 which receives the corresponding digital drive power signal for driving the light-emitting diodes L1–L16 through the drivers D1–D16. The driver Dj selected by the demultiplexer 34 applies an electric current to the corresponding light-emitting diode Lj, so that the intensity of the light beam emitted by the diode Lj corresponds to the analog drive power signal from the D/A converter 35.

The ROM 32 stores diode selecting data $y_j$ representative of the light-emitting diodes Lj, and drive power data $w_m$ representative of the drive power applied to the light-emitting diodes Lj through the respective drivers Di. In the present embodiment, a total of 256 sets of drive power data $w_m$ (m = 1 through 256). As in the preceding embodiment, four sets of drive power data $w_m$ used for reading in the dither-matrix fashion are initially determined according to a control program illustrated in the flow chart of FIG. 14(A).

Initially, the CPU 31 executes step S301 to select diode selecting data $y_j$ and drive power data $w_1$ (=$00_H$ in hexadecimal notation). Then, step S302 is implemented to activate the drive motor 14 based on the signal from the light-sensitive element 25 of the rotary encoder, for positioning the reading head 19 into alignment with a non-image or blank portion of the image-bearing surface of the copy sheet 12 or a reference reflector surface of a suitable member which has a reference light reflectance value.

Then, the control flow goes to step S303 wherein the data $y_j$ is retrieved from the ROM 32 and the retrieved data $y_j$ is applied to the demultiplexer 34, so that the driver D1 is selected. Step S303 is followed by step S304 in which the drive power data $w_1$ indicated in FIG. 15 is retrieved from the ROM 32 and the retrieved data $w_m$ is applied to the D/A converter 35, whereby the corresponding analog signal corresponding to the retrieved drive power data $w_1$ is applied to the driver D1. As a result, the light-emitting diode L1 is driven by an electric current corresponding to the output of the driver D1, whereby the corresponding reading spot S1 is irradiated by a light beam whose intensity corresponds to the amount of electric current applied to the diode L1, i.e., corresponds to the value of the drive power data $w_1$. The light beam reflected by the reading spot S1 is incident upon the light-receiving optical fiber R1 and transmitted therethrough to the corresponding light-sensitive element P1. Consequently, the output of the element P1 is applied to the corresponding comparator C1 through the amplifier A1. An output of the light-sensitive element P1 is compared with the predetermined reading threshold voltage Vr, by the comparator C1. An output of the comparator C1 is fed to the CPU 31, as an image signal SG.

The control flow then goes to step S305 to determine whether the level of the image signal SG is high or not. If the level of the image signal SG is low, the control flow goes to step S306 to determine whether the number "m" of the presently selected drive power data $w_m$ is equal to "256" (=$FF_H$ in hexadecimal notation), or not. If a negative decision (NO) is obtained in step S306, the CPU 31 executes step S307 in which the number "m" is incremented to select the next set of drive power data $w_m$, i.e., $w_2$ (=01H) Step S307 is followed by step S304 in which the drive power data $w_2$ is retrieved from the ROM 32 and the retrieved data $w_2$ is applied to the D/A converter 35. Then, the CPU 31 determines again in step S305 whether the level of the image signal SG obtained with the newly selected drive power data $w_2$ is high or not. Thus, steps S304, S305, S306 and S307 are repeatedly executed until the level of the obtained image signal SG becomes high in step S305. If the high-level image signal SG will not be obtained even after the last drive power data $w_{256}$ is selected, the control routine of FIG. 14(A) is terminated and a suitable alarm signal is produced to inform the operator that the instant optical reader fails to normally operate.

If the level of the image signal SG becomes high, the control flow goes to step S308 wherein the CPU 31 stores in RAM 33 the presently selected drive power data $w_m$ as reference or optimum drive power data $w_m$ (j) for the presently selected light-emitting diode Lj, in this case, as reference drive power data $w_m$ (1) for the diode L1.

The ROM 32 stores a table of decrements $-\Delta 1$ and increments $+\Delta 2$ and $+\Delta 3$, which are added to and subtracted from the value of the obtained reference drive power data $w_m(j)$, in order to calculate the three other sets of drive power data in addition to the reference drive power data $w_m(j)$.

Figure 14A:
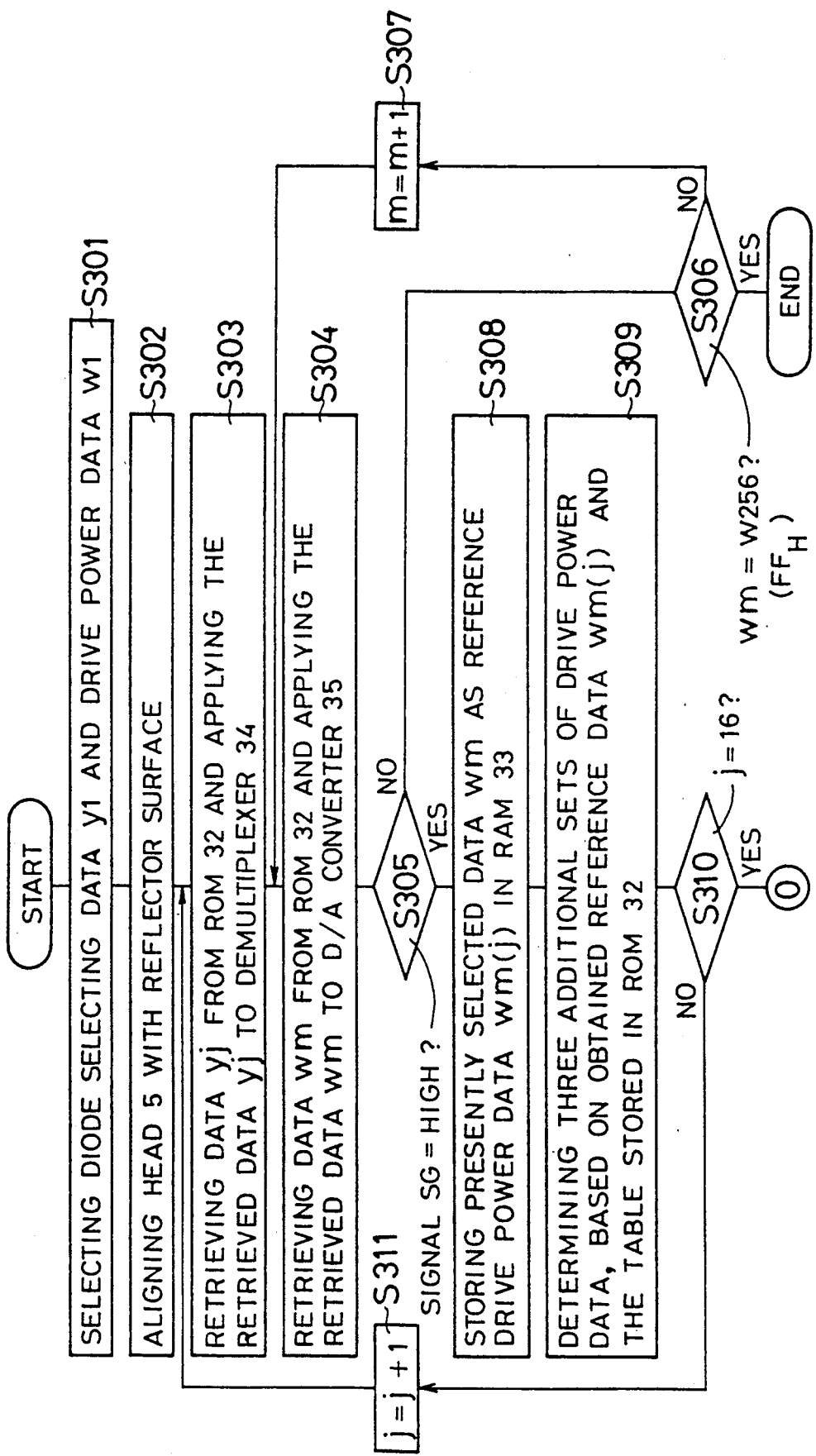
Figure 14C:
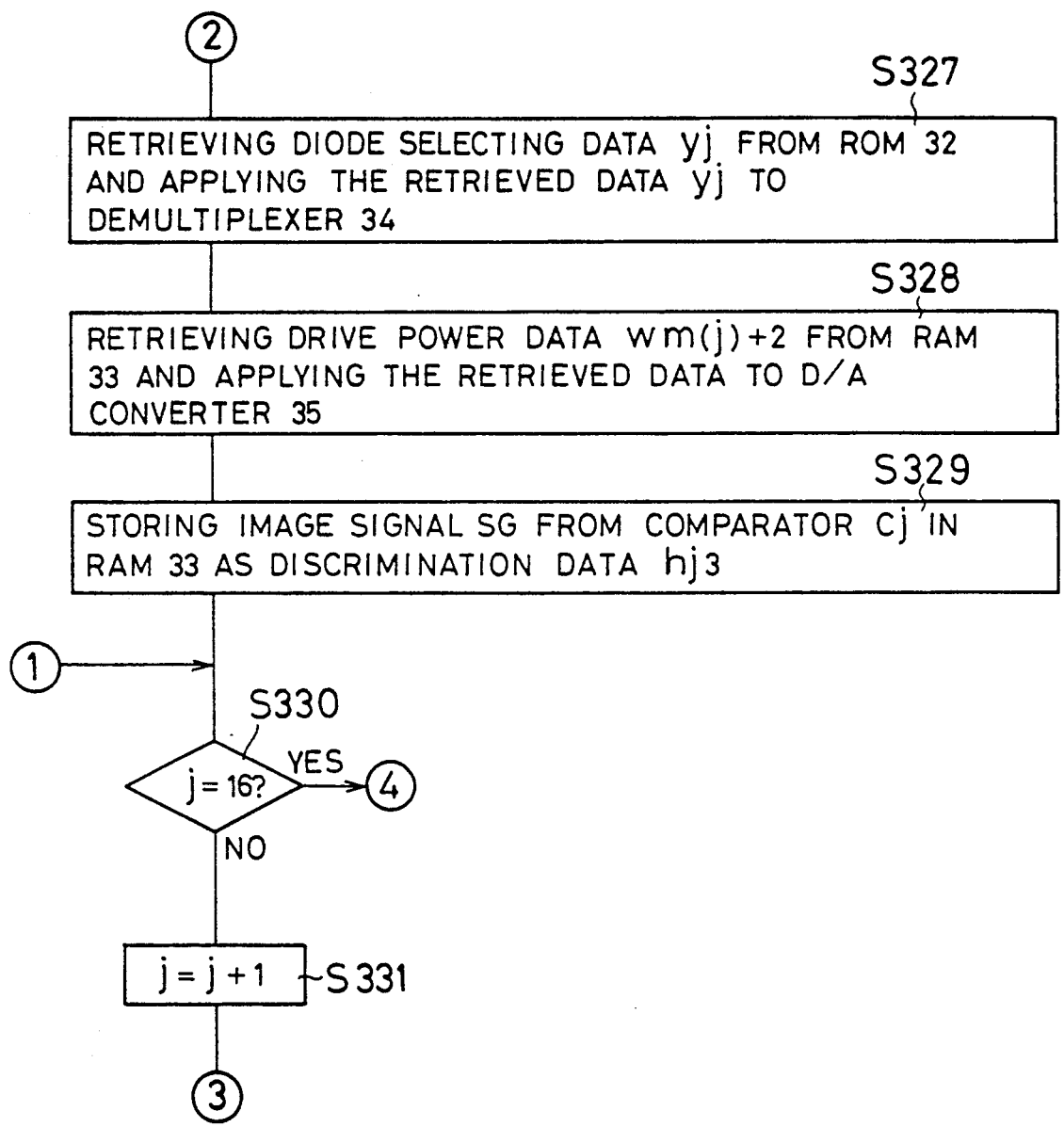
Figure 14E:
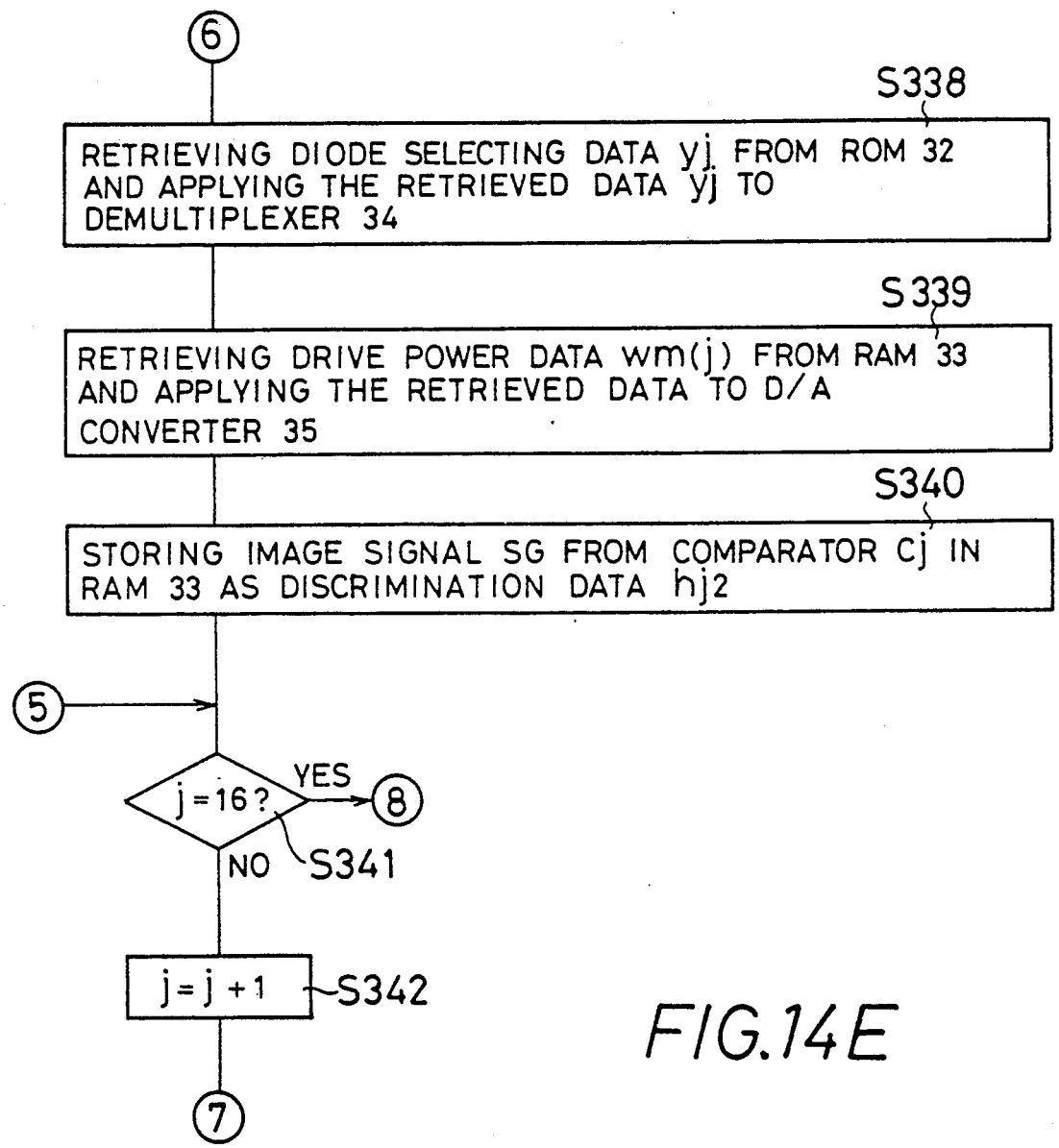
Figure 14F:
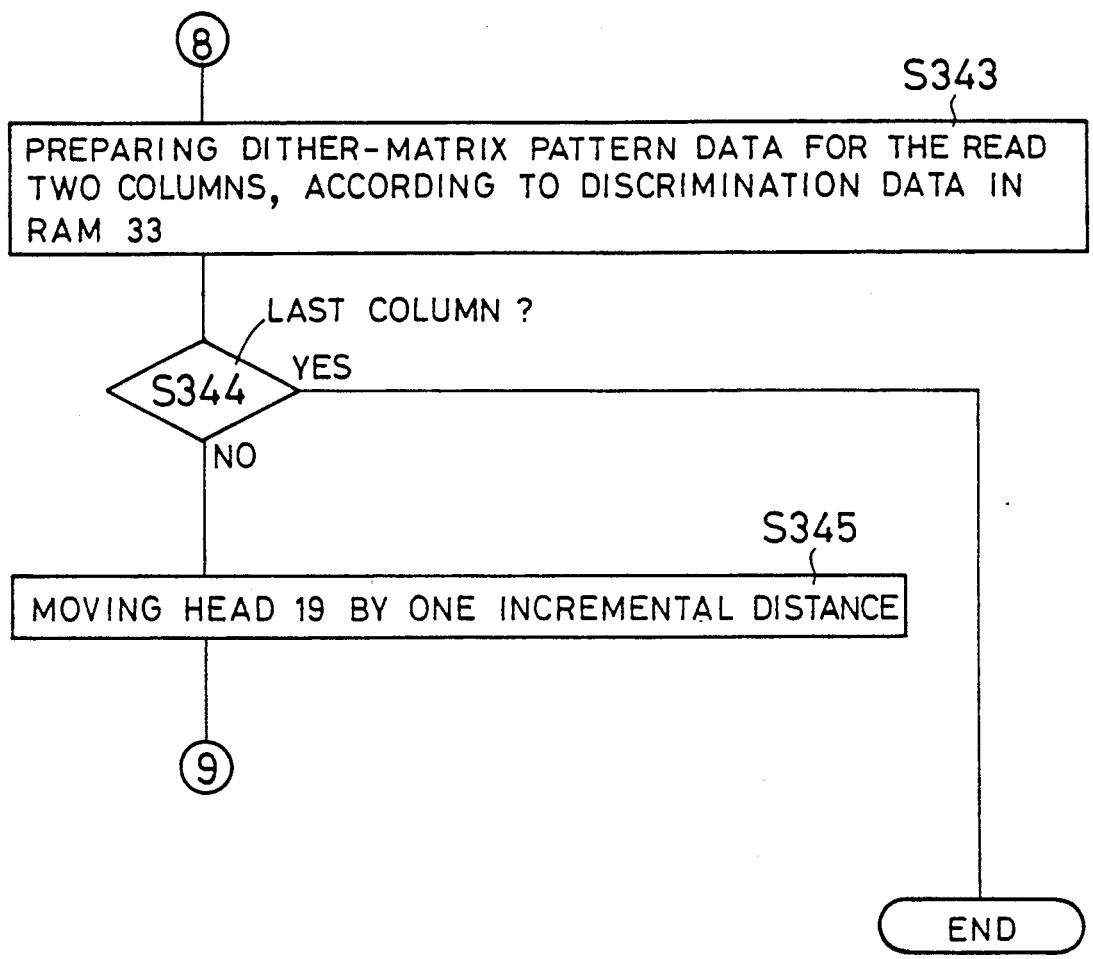

Referring back to the flow chart of FIG. 14(A), step S308 wherein the reference drive power data $w_m$ (1) for the diode L1 has been obtained is followed by step S309 in which the CPU 31 calculates the three additional sets of drive power data, i.e., $w_m$ (1) $-\Delta 1$, $w_m$ (1) $+\Delta 2$, and $w_m$ (1) $+\Delta 3$. If the value of the reference drive power data $w_m$ (1) obtained in step S308 is equal to $40_H$ (in hexadecimal notation), the decrement value $-\Delta 1$ is equal to $-0C_H$, and the two increment values are equal to $+16_H$ and $+3E_H$, respectively. Therefore, the first additional drive power data $w_m(1) -\Delta 1$ is equal to $34_H$, the second additional drive power data $w_m(1) +\Delta 2$ is equal to $56_H$, and the third additional drive power data $w_m$ (1) $+\Delta 3$ is equal to $7E_H$. These calculated three additional sets of drive power data are also stored in the RAM 33. If the calculated additional drive power data is smaller than $00_H$ or higher than $FF_H$, these lower or upper limit values are used as the additional data values.

Step S309 is followed by step S310 to determine whether the number "j" of the diode selecting data $y_j$ is equal to "16" or not. If a negative decision (NO) is obtained in step S310, the control flow goes to step S311 to increment the number "j". Consequently, the diode selecting data $y_2$ is retrieved from the ROM 32 and applied to the demultiplexer 34 to designate the next driver D2 to drive the diode L2 thereafter, steps S304–S307 are repeatedly executed until the high-level image signal SG is obtained in step S5. Then, step S308 is implement to store in the RAM 33 the currently selected drive power data $w_m$ as the reference drive power data $w_m(2)$ for the diode L2. Step S308 is followed by step S309 in which the CPU 31 calculates the additional three sets of drive power data, based on the obtained reference drive power data $w_m(2)$ and the table stored in the ROM 32. That is, the drive power data $w_m(2)-\Delta 1$, $w_m(2)+\Delta 2$ and $w_m(2)+\Delta 3$ are stored in the RAM 33.

The operation described above is repeated until the number "j" of the diode selecting data $y_j$ becomes equal to "16". Thus, the three additional data $w_m(j)+1$, $w_m(j)+\Delta 2$ and $w_m(j)+3$ are obtianed for each of the sixteen light-emitting diodes L1-L16, in addition to the reference drive power data $w_m(j)$.

It will be understood from the table of FIG. 16 that the decrements $-\Delta 1$ and the increments $+\Delta 2$ and $+\Delta 3$ are determined such that a difference between the adjacent two values of the four sets of drive power data $w_m(j)$, $w_m(j)+\Delta 1$, $w_m(j)+2$ and $w_m(j)+3$ increases as the value of the reference drive power data $w_m(j)$ increases. This manner of determination of the table of FIG. 16 is based on the fact that when the value of the reference drive power data $w_m(j)$ is relatively small, the output of the light-sensitive element Pj is relatively highly sensitive to a change in the drive power applied to the light-emitting diode Lj, since the output of the light-sensitive element Pj is less likely to be affected by the operating characteristics and physical properties of the light-emitting diode Lj, light-sensitive element Pj and optical fibers Tj, Rj. In other words, when the value of the reference drive power data $w_m(j)$ is relatively large, the output of the light-sensitive element Pj is relatively less sensitive to a change in the drive power applied to the light-emitting diode Lj, since the output of the light-sensitive element Pj is more likely to be affected by the operating characteristics and physical properties of the light-emitting diode Lj, light-sensitive element Pj and optical fibers Tj, Rj. Therefore, the additional three sets of drive power data are determined based on the reference drive power data $w_m(j)$, by subtracting and adding the decrements $-\Delta1$ and increments $+\Delta2$ and $+\Delta3$ from and to the reference drive power data $w_m(j)$, which decrements and increments are determined as described above. Each of the light-emitting diodes L1-L16 is driven with the thus determined four sets of drive power data $w_m(j)$, $w_m(j)+\Delta1$, $w_m(j)+\Delta2$ and $w_m(j)+\Delta3$, so that each of the light-sensitive element P1-P16 produces four different levels of output signals.

A dither-matrix reading operation utilizing the thus prepared four sets of drive power data for the light-emitting diodes Lj is accomplished according to a control routine indicated in the flow chart of FIGS. 14(B)-14(F), in the following manner. The control routine is adapted to effect one horizontal scanning operation of 16 lines on the image-bearing surface of the copy sheet 12, while the reading head 19 having the vertical array of the 16 reading portions (reading spots) corresponding to one vertical column is moved in the image reading direction. Since the control routine of the present embodiment is similar to that of the preceding embodiment, only the aspects of the present embodiment that differ from the preceding embodiment will be described, in the interest of brevity and simplification.

Steps S321 through S331 are executed to effect reading of the odd-numbered columns, while steps S332 through S342 are executed to effect reading of the even-numbered columns. In the reading of the odd-numbered columns, step S323 of FIG. 14(B) is implemented to determine whether the relevant reading spot is odd-numbered or even-numbered as counted from the top of the vertical array of the reading spots. For the odd-numbered reading spots, the drive power data $w_m(j) - \Delta1$ is used in step S325. For the even-numbered reading spots, the drive power data $w_m(j) + \Delta2$ is used in step S328 of FIG. 14(C). In the reading of the even-numbered columns, step S334 of FIG. 14(D) is implemented to determine whether the relevant reading spot is odd-numbered or not. For the odd-numbered reading spots, the drive power data $w_m(j) + \Delta3$ is used in step S336. For the even-numbered reading spots, the reference drive power data $w_m(j)$ is used in step S339 FIG. 14(E). After the adjacent odd-numbered and even-numbered columns have been read, the obtained discrimination data representative of the presence or absence of the achromatic tone in each reading spots is re-arranged in step S343 of FIG. 14(F) into dither-matrix pattern data for the two columns, as illustrated in FIG. 6.

Similar operations are performed for the other columns while the reading head 16 is moved in the image reading direction from left to right. Consequently, the 16 horizontal lines are scanned or read. Then, the copy sheet 12 is fed by an incremental distance which corresponds to 16 horizontal lines, according to a program not shown, and the above-indicated reading procedure is repeated.

The present embodiment eliminates conventionally required adjustment of the reading threshold voltage, and permits the dither-matrix reading of a gray scale or multi-tone image such as a photograph.

Step S343 is followed by step S344 to determine whether the last column has been read or not. If a negative decision (NO) is obtained in step S344, the control flow goes to step S345 in which the reading head 19 is moved by the predetermined incremental distance, with the drive motor 14 activated based on the signal from the light-sensitive element 25 of the rotary encoder. Then, steps S322 through S345 are repeated so that all the columns of the relevant 16 horizontal lines are read. When an affirmative decision (YES) is obtained in step S444, the control routine is terminated.

As in the preceding embodiment, the reading spots S1-S16 are irradiated by the light beams having four different intensities, with the corresponding light-emitting diodes L1-L16 driven by the four sets of drive power data described above. As a result, a gray scale image having a shade variation from white to black, as indicated by the reading areas DN1-DN5 of FIG. 4(B), may be read as dither-matrix pattern data consisting of the discrimination data $h_{11}$, $h_{14}$, $h_{23}$ and $h_{22}$, as illustrated in FIG. 6.

In the two embodiments described above, the reading operations are conducted with the light-emitting diodes driven by the reference drive power data which is determined by irradiating the reference reflector surface which has a reference light reflectance value. Usually, however, the distance between the reading head and the reference reflector surface is different from the distance between the reading head and the image-bearing surface of an original copy sheet. Therefore, the optimum or reference intensity of a light beam irradiating a reading spot on the image-bearing surface of the copy sheet is different from that obtained with respect to a light beam irradiating the reference reflector surface. Accordingly, the reference drive power data obtained with respect to the reflector surface should be compensated for the difference between the above-indicated distances. An example of the manner of effecting this compensation will be described below, referring to FIGS. 17, 18 and 19(A), 19(B) and 19(C), which shows a third embodiment of the present invention. While the present embodiment is a line optical reader which employs a reading head having a horizontal array of reading portions arranged to cover the entire width of an image-bearing surface of an original copy sheet, the principle of the reference drive power compensation of the present embodiment is equally applicable to optical readers with the shutter type reading head as used in the first embodiment or the serial type reading head as used in the second embodiment.

Figure 17:
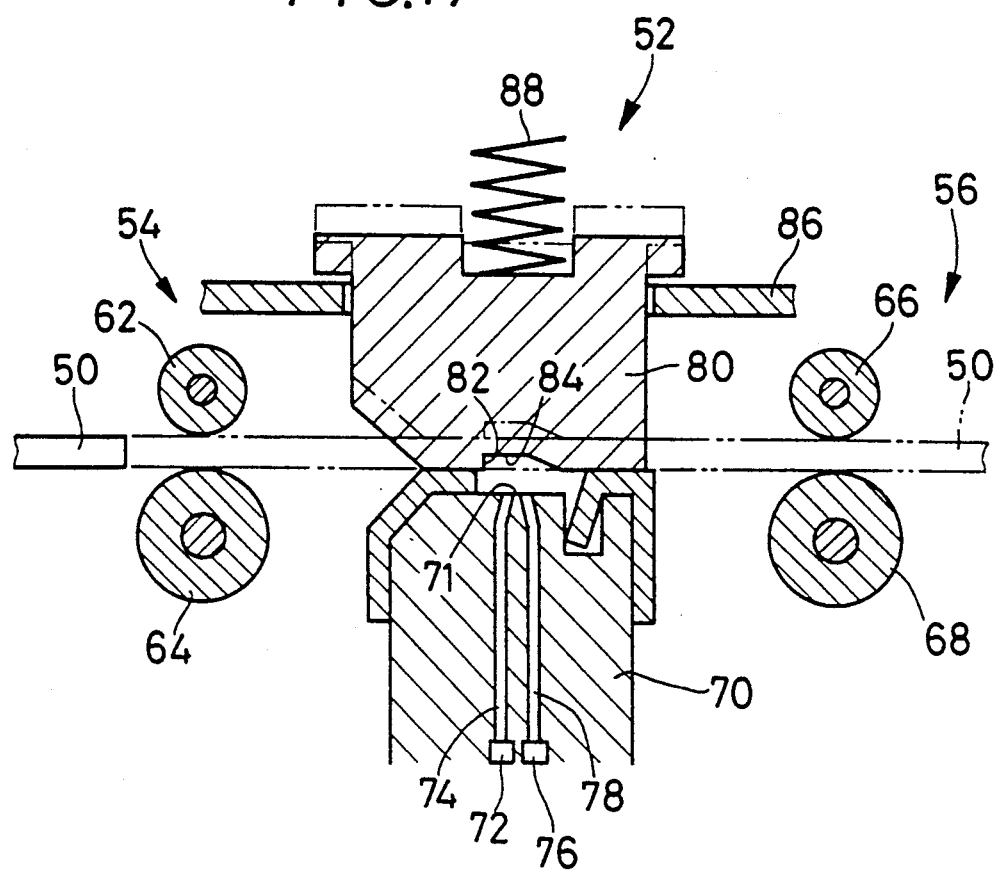
FIG. 17 is a fragmentary elevational view in cross section of a reading head of a further embodiment of the present invention.

FIG. 17 shows a part of the optical reader which includes an image reading section indicated at 52, a sheet feed-in section indicated at 54, and a sheet feed-out section indicted at 56. The sheet feed-in section 54 is adapted to feed an original copy sheet 50 into the image reading section 52, and the copy sheet 50 is passed through the image reading section 52 and fed out through the sheet feed-out section 56.

The sheet feed-in section 54 includes a small-diameter driven feed roll 62, and a large-diameter driving feed roll 64. The driven feed roll 62 is biased by a suitable sheet spring toward the driving feed roll 64 so that the copy sheet 50 is fed through a pressure nip between the two feed rolls 62, 64, by rotation of the driving feed roll 64 by a suitable drive source. The sheet feed-out section 56 includes a small-diameter driven feed roll 66 and a large-diameter driving feed roll 68 which are similar to the feed rolls 62, 64, so that the copy sheet 50 which has been read by the image reading section 52 is fed out.

The image reading section 52 includes a reading head 70 which has a horizontal array of multiple reading portions arranged on a longitudinal reading surface indicated at 71 in FIG. 17. Each reading portion is defined by the light-emitting end of a light-emitting optical fiber 74 optically coupled to a light-emitting diode (LED) 72, and the light-receiving end of a light-receiving optical fiber 78 coupled to a light-sensitive photodiode (PD) 76. In the present arrangement, a light beam emitted by the light-emitting diode 72 is transmitted through the corresponding light-emitting optical fiber 74, to irradiate the corresponding reading spot. The light beam reflected by the reading spot is received by the light-receiving optical fiber 78 and transmitted to the corresponding photodiode 76.

Above the reading head 70, there is disposed a sheet holder member 80 which is supported by a support frame 86 such that the holder member 80 is movable toward and away from the reading head 70, in a direction perpendicular to the direction of feed of the copy sheet 50. The holder member 80 is biased by a spring 88 toward the reading head 70. The holder member 80 has a recessed portion 82 formed in its surface facing the reading head 70. The recessed portion 82 has a bottom surface which serves as a reference reflector surface 84 having a reference light reflectance value. When the reference drive power for the light-emitting diodes 72 is determined, the sheet holder member 80 is placed in its advanced position indicated in solid line in FIG. 17. When the optical reader is operated to read the image-bearing surface of the copy sheet 50, the sheet holder member 80 is placed in its retracted position indicated in broken line, so that the holder member 80 cooperates with the reading head to properly guide the copy sheet 50.

Figure 18:
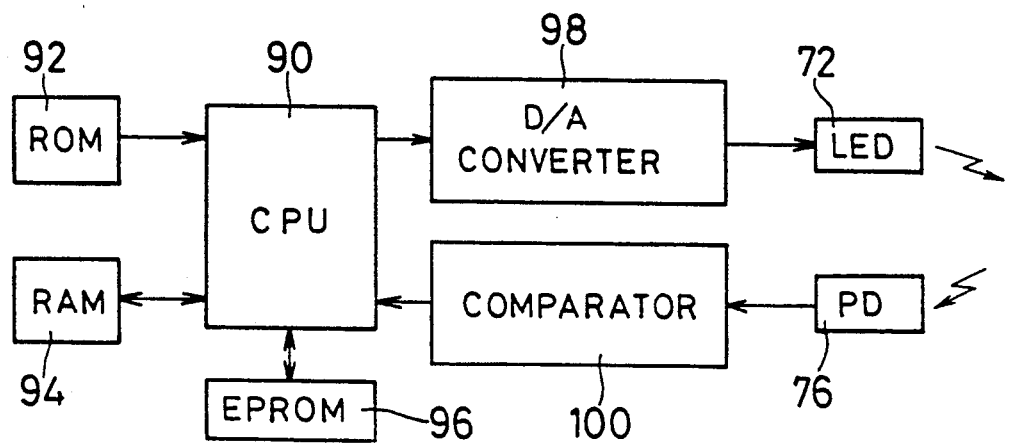
FIG. 18 is a schematic block diagram showing a control system of the embodiment of FIG. 17.

The optical reader constructed as described above is controlled by a control system as illustrated in the schematic block diagram of FIG. 18. The control system includes a CPU 90, a ROM 92, a RAM 94 and an EPROM (erasable programmable read-only memory) 96. The CPU 90 applies predetermined drive power data to a D/A converter 98 to drive the light-emitting diodes (LED) 72, receives image signals from comparators 100 coupled to the light-sensitive photodiodes (PD) 76, and stores and retrieve various data into and from the EPROM 96. The D/A converter 98 converts the received drive power data in the form of a digital signal into a corresponding analog signal to drive the selected light-emitting diode 72, so that the intensity of a light beam emitted by the diode 72 to irradiate the corresponding reading spot on the copy sheet 50 corresponds to the value of the drive power data. The light beam reflected by the reading spot is received by the corresponding photodiode 76, which produces an output voltage which is proportional to the intensity of the reflected light beam. The corresponding comparator 100 compares this output voltage with a predetermined threshold voltage, and produces a binary image signal representative of one of two levels of the achromatic tone (black and white) in the reading spot, depending upon the result of comparison of the received output voltage of the photodiode 76 with the threshold voltage. The image signal is applied to the CPU 90.

Figure 19A:
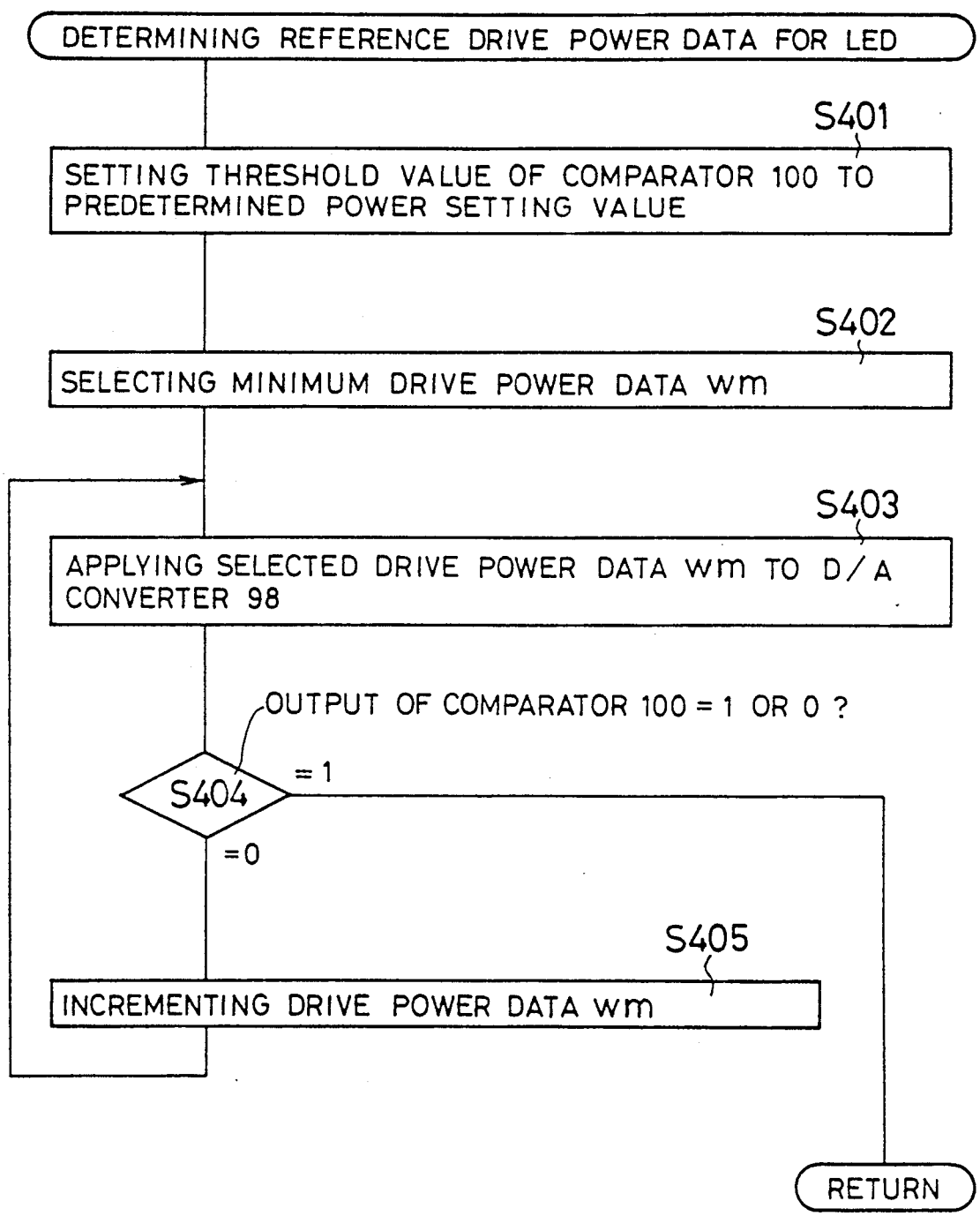
FIGS. 19(A), 19(B) and 19(C) are flow charts showing an operation of the embodiment of FIG. 17.
Figure 19B:
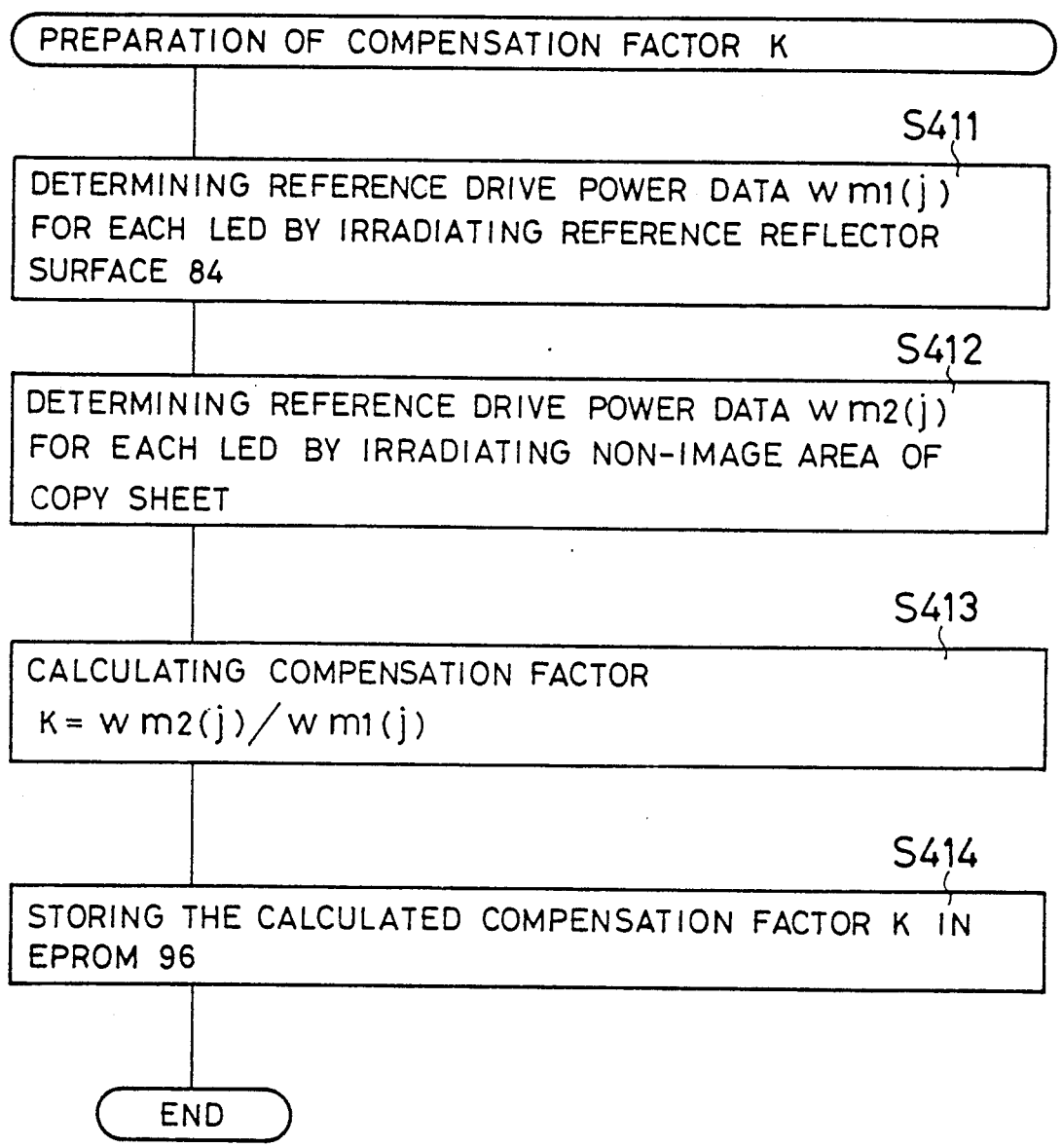
Figure 19C:
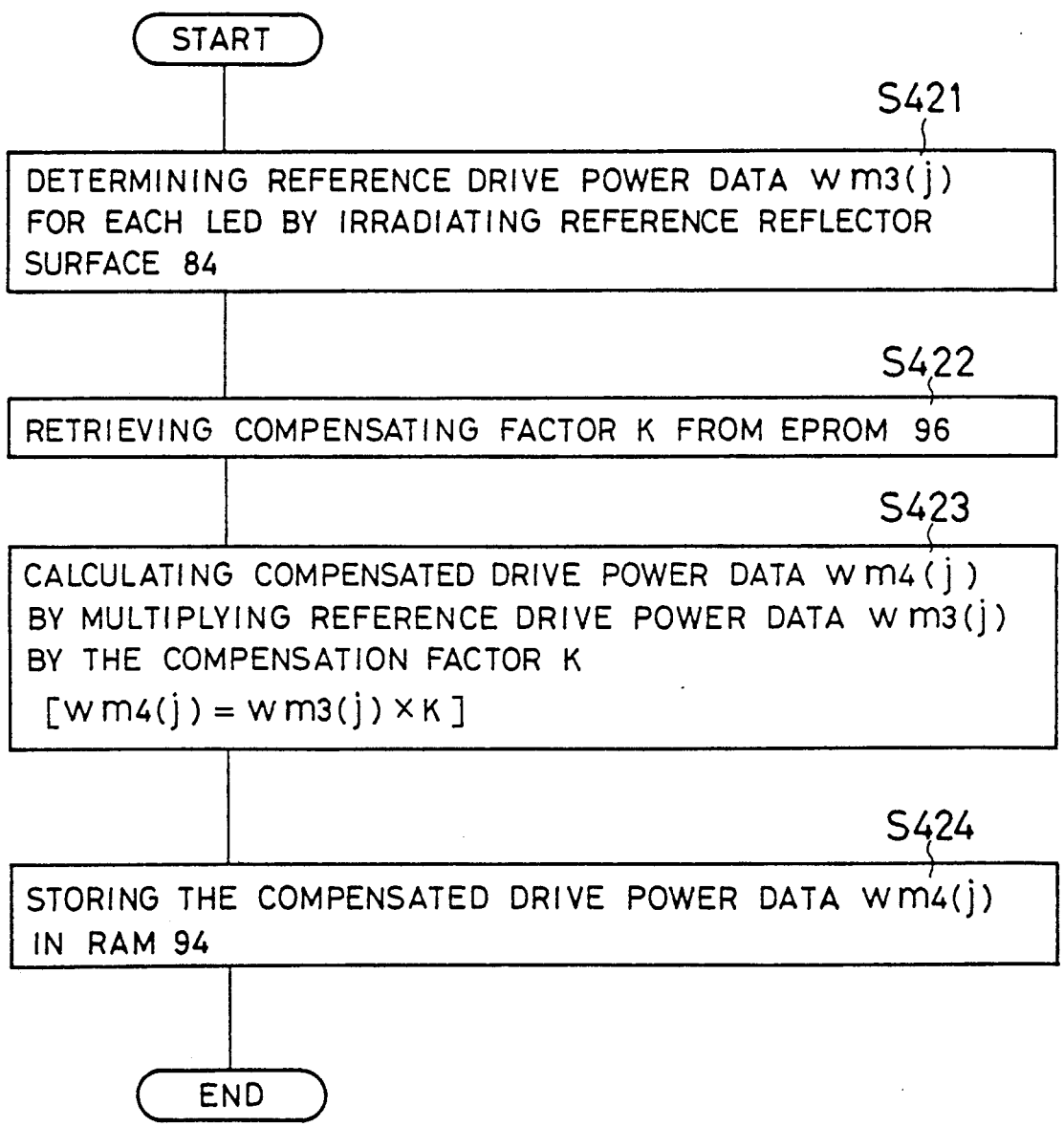

Referring to FIGS. 19(A), 19(B) and 19(C), there will be described an operation of the present optical reader controlled by the CPU 90. In the present optical reader, a reference or optimum value of drive power to drive each light-emitting diode 72 is determined by multiplying a reference value of drive power obtained by irradiating the reference reflector surface 84, by a predetermined compensation factor, for the reason described above. The compensation factor is determined and stored in the EPROM 96, before the reading head 70 initiates an image reading operation. More specifically, each of the reflector surface 84 and a non-image or blank or purely white area of the copy sheet 50 is irradiated with light beams having different intensities, and optimum values of drive power (i.e., two sets of reference drive power data) to drive each light-emitting diodes 72 are determined, in the manner as described below by reference to FIGS. 19(A) and 19(B). The ratio of the obtained two optimum values is used as the compensation factor indicated above. Upon starting an image reading operation, the reference drive power data is again obtained by irradiating the reflector surface 84, and the obtained reference drive power data on the reflector surface 84 is multiplied by the predetermined compensation factor, as indicated in FIG. 19(C), to establish the optimum drive power data actually used to drive each light-emitting diode 72 during the image reading operation.

Described more specifically, the optimum value of drive power or reference drive power data may be determined according to the procedure illustrated in the flow chart of FIG. 19(A). This procedure is applicable to both the reference reflector surface 84 and the non-image or blank area of the copy sheet 50. Initially, step S401 is executed to set the threshold value of the comparator 100 to a predetermined power setting value which is higher than the reading threshold value used to determine the level of the image signal during an image reading operation. Step S401 is followed by step S402 wherein the minimum drive power data $w_m$ is selected and retrieved from the ROM 92. Then, the control flow goes to step S403 to apply the retrieved minimum drive power data $w_m$ to the D/A converter 98, to drive the light-emitting diode 72. Consequently, the diode 72 emits a light beam whose intensity corresponds to the minimum drive power data $w_m$, and the corresponding output voltage of the photodiode 76 is compared by the comparator 100 with the power setting threshold value indicated above. Depending upon the result of this comparison, the comparator 100 produces a binary image signal, whose level is either "0" or "1". Then, the CPU 90 receiving the image signal determines in step S404 whether the level of the received image signal is "0" or "1". If the image signal level is "0", step S404 is followed by step S405 wherein the number "m" of the drive power data $w_m$ is incremented, i.e., the next higher drive power data is selected. The control flow then goes back to step S403. Steps S403–S405 are repeatedly executed until the level of the image signal produced by the comparator 100 becomes "1". The drive power data $w_m$ selected when the level of the image data becomes "1" is determined as the reference drive power data, and the control routine of FIG. 19(A) is terminated. This procedure may be used for the determination of the reference drive power data with respect to both the reference reflector surface 84 and the non-image area of the copy sheet 50. Since the reference drive power data to drive each light-emitting diode 72 is determined based on the light reflectance value of the reflector surface 84, an image reading operation on the instant optical reader will not be influenced by variations or differences of physical properties and operating characteristics of the various optical components. In the actual image reading operation, the threshold value used for the comparator 100 is set to the predetermined reading threshold value which is lower than the power setting value. That is, the reading threshold value is lower than a value which corresponds to the light reflectance value of the reference reflector surface 84.

Referring to the flow chart of FIG. 19(B), there will be described a procedure to determine the compensation factor used for calculating the optimum value of drive power for each diode 72 based on the reference drive power data obtained with respect to the reflector surface 84. Initially, the CPU 90 executes step S411 in which the reference drive power data $w_{m1}(j)$ for each light-emitting diode 72 is determined by irradiating the reference reflector surface 84, in the manner as illustrated in FIG. 19(A). Step S411 is followed by step S412 in which the reference drive power data $w_{m2}(j)$ for each diode 72 is determined by irradiating a non-image or blank area of the copy sheet 50, in the manner as illustrated in FIG. 19(A). Then, the control flow goes to step S413 to calculate the compensation factor K, by dividing the determined reference drive power data $w_{m2}(j)$ by the determined reference drive power data $w_{m1}(j)$. Namely, $K = w_{m2}(j)/w_j)$. In the next step s414, the calculated compensation factor K is stored in the EPROM 96. It will be understood that the compensation factor K is a ratio of the reference drive power data $w_{m2}(j)$ obtained with the non-image area of the copy sheet 50 to the reference drive power data $w_{m1}(j)$ obtained with the reflector surface 84. This ratio relates to differences in the light reflectance value and position between the reflector surface 84 and the image-bearing surface of the copy sheet 50. Since the two sets of drive power data $w_{m1}(j)$ and $w_{m2}(j)$ are obtained substantially at the same point of time, the compensation factor K obtained is not influenced by chronological changes of the physical properties of the optical system.

Reference is now made to the flow chart of FIG. 19(C), which illustrates an operation to finally determine the optimum value of drive power to drive each light-emitting diode 72, based on the reference drive power data $w_{m1}(j)$ and the compensation factor K stored in the EPROM 96. The operation of FIG. 19(C) is performed prior to an operation of the reading head 70 to read the image-bearing surface of the copy sheet 50. Initially, step S421 is executed to determine reference drive power data $w_{m3}(j)$ by irradiating the reflector surface 84, in the manner illustrated in FIG. 19(A). This reference drive power data is expressed by $w_{m3}(j)$, since it is obtained at a time different from that of the reference drive power data $w_{m1}(j)$ of step S411 of FIG. 19(B). Step S421 is followed by step S422 in which the compensation factor K is retrieved from the EPROM 96. Then, the control flow goes to step S423 in which the CPU 90 calculates reference drive power data $w_{m4}(j)$ by multiplying the determined reference drive power data $w_{m3}(j)$ by the retrieved compensation factor K. This reference drive power data $w_{m4}(j)$ represents the optimum value of drive power to drive each light-emitting diode 72 during an image reading operation of the reading head 70. Then, step S424 is implemented to store the calculated reference drive power data $w_{m4}(j)$ in the RAM 94.

Suppose reference drive power data $w_{m5}(j)$ is obtained by irradiating the non-image area of the copy sheet 50 prior to starting an image reading operation on the copy sheet. Since the ratio of $w_{m5}(j)/w(j)$ is considered almost equal to the ratio $w_{m2}(j)/w_{m1}(j)$ [$=K$] because of the concurrent determination of the former two values and the concurrent determination of the latter two values, the value $w_{m5}(j)$ can be obtained by multiplying the value $w_{m3}(j)$ by the compensation factor K. That is, $w_{m5}(j) = w_{m3}(j) \times K = w_{m4}(j)$.

In the present embodiment, the optimum value of drive power to actually drive each light-emitting diode 72 is determined by the predetermined reference drive power $w_{m4}(j)$ which is obtained based on the light reflectance value of the reference reflector surface 84 and which is compensated based on the known relation (compensation factor K) between the optimum values of drive power determined with respect to the reflector surface 84 and the non-image area of the copy sheet 50. Therefore, the instant optical reader is free from a reading error of the reading head 70 which would occur due to differences or variations of the physical properties and operating characteristics of the individual optical components, and due to chronological changes of these properties and characteristics. Further, the reading accuracy is not influenced by the differences in the light reflectance value and position between the reference reflector surface 84 and the non-image area of the copy sheet 50.

Although the predetermined compensation factor K is used to determine the optimum drive power to drive the light-emitting diodes 72, based on the predetermined reference drive power data obtained with respect to the reflector surface 84, the manner of determining the optimum drive power is not confined to the precise details of the instant embodiment illustrated in FIGS. 19(A)-19(C), and may be suitably modified as needed.

While the present invention has been described in its presently preferred embodiments with a certain degree of particularities, for illustrative purpose only, it is to be understood that the invention is not limited to the details of the illustrated embodiments, but may be embodied with various changes, modifications and improvements, which may occur to those skilled in the art, in the light of the foregoing disclosure, without departing from the spirit and scope of the invention defined in the following claims.

What is claimed is:

1. An apparatus for effecting discrimination between a dither-matrix reading area and a non-dither-matrix reading area on a subject copy which is optically read, comprising:

irradiating means for irradiating local segments of an image-bearing surface of said subject copy with light beams having different intensities;

reading means for receiving the light beams reflected from said local segments of the subject copy, and obtaining image data representative of a presence or an absence of an achromatic tone in each of said local segments based on an amount of the light beam reflected by each said local segment;

reading control means for operating said irradiating means and said reading means to irradiate the local segments in a predetermined discrimination zone of said image-bearing surface, first with the light beam having a first intensity of said different intensities, and then with the light beam having a second intensity of said different intensities which is different from said first intensity, to obtain first image data and second image data, respectively;

comparing means for comparing said first and second image data of said each local segment in said predetermined discrimination zone, with each other, and determining whether said first and second image data agree with each other, or not, for said each local segment; and discriminating means for determining that said discrimination zone is said dither-matrix reading area, if a degree of disagreement of said first and second image data of said discrimination zone exceeds a predetermined reference value, said discriminating means determining that said discrimination zone is said non-dither-matrix reading area, if said degree of disagreement does not exceed said reference value.

2. An optical reader for reading an image on said subject copy, comprising:

said apparatus for effecting discrimination as defined in claim 1;

first irradiation control means for operating said irradiating means to irradiate the local segments of said subject copy with a plurality of radiations having respective different intensities;

second irradiation control means for operating said irradiation means to irradiate said local segments of said subject copy with a radiation having a given intensity; and selector means for activating said first irradiation control means, if said discriminating means determines that said discrimination zone is said dither-matrix reading area, and activating said second irradiation control means, if said discriminating means determines that discrimination zone is said non-dither-matrix reading area.

3. An optical reader according to claim 2, wherein said discrimination zone consists of each one of a plurality of divisions of said image-bearing surface of said subject copy, said discriminating means effecting determination of said dither-matrix reading area or said non-dither-matrix reading area for said each one of said plurality of divisions.

4. An optical reader according to claim 3, wherein each of said plurality of divisions consists of a row of a plurality of reading spots which are arranged in a direction perpendicular to a direction of feed of said subject copy.

5. An optical reader according to claim 2, further comprising:

said irradiating means including at least one light-emitting element for irradiating said local segments of said subject copy;

said reading means including at least one light-sensitive element for receiving the reflected light beams from said local segments and producing an output corresponding an amount of each of said reflected light beams, and comparing means for comparing said output with a first threshold value and thereby determining said presence or absence of the achromatic tone in said each local segment;

reference power determining means for determining a reference value of drive power to drive each of said at least one light-emitting element, such that said output of a corresponding one of said at least one light-sensitive element reaches a predetermined second threshold value when said each light-sensitive element receives a light beam which is emitted by said each light-emitting element driven by said reference value of drive power and which is reflected by a reference reflector surface having a reference light reflectance value; and setting means for determining a plurality of set values of drive power for said each light-emitting element, based on said reference value of drive power determined by said reference power determining means, and according to a predetermined relationship between said reference value and said plurality of set values.

6. An optical reader according to claim 5, wherein said predetermined relationship is determined such that a difference between two adjacent values of said plurality of set values of drive power increases with said reference value of drive power.

7. An optical reader according to claim 5, further comprising:

a reading head having said at least one light-emitting element and said at least one light-sensitive element;

a sheet holder member disposed movably toward and away from said reading head and cooperating with said reading head to elastically hold a sheet of said subject copy therebetween, said sheet holder member having a recessed portion facing said reading head, said recessed portion having a bottom surface which defines said reference reflector surface;

adjusting means for activating said reference power determining means to determine said reference value of drive power as a first reference value by irradiating said reference reflector surface, before said reading control means operates said irradiating means and said reading means to cause said reading head to read said image-bearing surface of said subject copy; and compensating means for compensating said first reference value of drive power determined by said adjusting means, according to a predetermined relationship between said first reference value and a second reference value of drive power which is obtained by activating said reference power determining means so as to irradiate a non-image area of said image-bearing surface of said sheet of the subject copy while said sheet is held between said reading head and said sheet holder member, said each light-emitting element being driven by the compensated first reference value of drive power while said image-bearing surface of the subject copy is read by said reading head.

8. An optical reader according to claim 7, further comprising means for determining whether said irradiating means is irradiating said reference reflector surface of said sheet holder member or said non-image area of said image-bearing surface of said sheet of the subject copy.

9. An optical reader according to claim 5, further comprising:

said reference power determining means including power increasing means for increasing the drive power for said each light-emitting element;

inhibiting means for inhibiting said power increasing means from increasing said drive power if said output of said corresponding light-sensitive element does not reaches said predetermined second threshold value when said drive power is increased by said power increasing means to a predetermined level; and alarming means for constituting an alarm when said inhibiting means is activated.

10. An apparatus according to claim 1, wherein said reading means includes at least one light-sensitive element each of which receives a light beam reflected from said local segments and produces an output representative of an amount of the received light beam, and a comparator which compares said output of each said light-sensitive element with a predetermined threshold value and produces a binary output signal representative of said presence or absence of said achromatic tone, said first and second image data consisting of the binary output signals produced by said comparator when said local segments are irradiated with the light beams having said first and second intensities, respectively.

11. An apparatus according to claim 1, wherein said discrimination zone consists of each one of a plurality of divisions of said image-bearing surface of said subject copy, each said division consisting of a row of reading spots which are arranged in a direction perpendicular to a direction of feed of said subject copy.

12. An optical reader for reading an image-bearing surface of a subject copy, comprising:
irradiating means for irradiating local segments of said image-bearing surface of the subject copy;
light-sensitive means for receiving light beams reflected by said local segments of the image-bearing surface, and producing outputs corresponding to amounts of said light beam reflected by said local segments;
reading means for reading said image-bearing surface, based on said output of said light-sensitive means as compared with a first threshold value;
reference power determining means for determining a reference value of drive power to drive said irradiating means, such that said output of said light-sensitive means reaches a predetermined second threshold value when said light-sensitive means receives a light beam which is emitted by said irradiating means by said reference value of drive power and which is reflected by a reference reflector surface having a reference light reflectance value;
setting means for determining a plurality of set values of drive power for said irradiating means, based on said reference value of drive power determined by said reference power determining means, and according to a predetermined relationship between said reference value and said plurality of set values; and
irradiation control means for driving said irradiation means by said plurality of set values of drive power, to irradiate the local segments of said subject copy with light beams having different intensities.

13. An optical reader according to claim 12, wherein said predetermined relationship is determined such that a difference between two adjacent values of said plurality of set values of drive power increases with said reference value of drive power.

14. An optical reader for reading an image-bearing surface of a subject copy, comprising:
a reading head including light-emitting means for irradiating local segments of said image-bearing surface with light beams, and light-sensitive means for receiving the light beams reflected by said local segments and producing outputs corresponding to amounts of the reflected light beams;
a sheet holder member disposed movably toward and away from said reading head and cooperating with said reading head to elastically hold a sheet of said subject copy therebetween, said sheet holder having a recessed portion facing said reading head, said recessed portion having a bottom surface which defines a reference reflector surface having a reference reflectance value;
reference power determining means for determining a first reference value of drive power to drive said light-emitting means, such that each of said outputs of said light-sensitive means reaches a predetermined threshold value when said light-sensitive means receives a light beam which is emitted by said light-emitting means by said reference value of drive power and which is reflected by said reference reflector surface of said sheet holder member;
first control means, operable before an operation of said reading head to read said image-bearing surface and operable with said light-emitting means facing said reference reflector surface, for activating said reference power determining means to obtain said first reference value of drive power;
compensating means for compensating said first reference value of drive power, according to a predetermined relationship between said first reference value of drive power, and a second reference value of drive power which is to be obtained if said reference power determining means is activated with said light-emitting means facing a non-image area of said sheet of the subject copy while said sheet is held between said reading head and said sheet holder member; and
drive means for driving said light-emitting means by said second reference value of drive power, while said image-bearing surface of said subject copy is read by said reading head.

15. An optical reader according to claim 14, further comprising relationship determining means which includes:
second control means, operable before the operation of said first control means, for activating said reference power determining means to obtain said reference value of drive power as a third reference value;
third control means, operable before the operation of said fist control means, for activating said reference value of drive power as a fourth reference value; and
means for determining a relationship between said third and fourth reference values of drive power, to determine said predetermined relationship between said first and second references values of drive power.

16. An optical reader according to claim 15, wherein said relationship between said first and second reference values of drive power to drive said light-emitting means is determined by a ratio of said third reference value obtained by said second control means to said fourth reference value obtained by said third control means.

* * * * *

UNITED STATES PATENT AND TRADEMARK OFFICE
CERTIFICATE OF CORRECTION

PATENT NO. : 5,016,117
DATED : May 14, 1991
INVENTOR(S) : Takayuki MATSUMOTO et al.

It is certified that error appears in the above-indentified patent and that said Letters Patent is hereby corrected as shown below:

Title page, item

[73] Assignee: Change the Assignee from "Brother Kogyo Kabushiki Kaisha, Aichi, Japan" to --Brother Kogyo Kabushiki Kaisha of Aichi, Japan; and Nippon Telegraph and Telephone Corporation of Tokyo, Japan--.

Signed and Sealed this

Eleventh Day of October, 1994

Attest:

BRUCE LEHMAN

Attesting Officer

Commissioner of Patents and Trademarks